United States Patent
Ebisawa et al.

(10) Patent No.: US 9,570,722 B2
(45) Date of Patent: Feb. 14, 2017

(54) POWER STORAGE DEVICE

(71) Applicant: Japan Aviation Electronics Industry, Limited, Tokyo (JP)

(72) Inventors: Takeshi Ebisawa, Tokyo (JP); Katsuhiko Nakazawa, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 148 days.

(21) Appl. No.: 14/360,158

(22) PCT Filed: Dec. 11, 2012

(86) PCT No.: PCT/JP2012/082036
§ 371 (c)(1),
(2) Date: May 22, 2014

(87) PCT Pub. No.: WO2013/103072
PCT Pub. Date: Jul. 11, 2013

(65) Prior Publication Data
US 2014/0308557 A1    Oct. 16, 2014

(30) Foreign Application Priority Data
Jan. 4, 2012  (JP) ................. 2012-000167

(51) Int. Cl.
| | | |
|---|---|---|
| *H01M 10/38* | (2006.01) | |
| *H01M 2/10* | (2006.01) | |
| *H01R 13/631* | (2006.01) | |
| *H01M 2/20* | (2006.01) | |
| *H01R 13/514* | (2006.01) | |
| *H01R 4/48* | (2006.01) | |
| *H01R 13/15* | (2006.01) | |
| *H01R 13/447* | (2006.01) | |
| *H01R 13/74* | (2006.01) | |

(52) U.S. Cl.
CPC ......... *H01M 2/1077* (2013.01); *H01M 2/1061* (2013.01); *H01M 2/20* (2013.01);
(Continued)

(58) Field of Classification Search
CPC .... H01M 2/1061; H01M 2/1077; H01M 2/20; H01M 2/202; H01R 13/15; H01R 13/447; H01R 13/514; H01R 13/6315; H01R 13/745; H01R 4/4863
See application file for complete search history.

(56) References Cited

U.S. PATENT DOCUMENTS

2001/0033502 A1* 10/2001 Blair ................. H02J 7/0022
363/65
2004/0157117 A1    8/2004 Tamaki et al.
(Continued)

FOREIGN PATENT DOCUMENTS

| EP | 2 416 407 A | 2/2012 |
|---|---|---|
| JP | 2002-117821 A | 4/2002 |

(Continued)

OTHER PUBLICATIONS

European Search Report dated Oct. 17, 2014 in European Application No. 12864340.0.
(Continued)

*Primary Examiner* — Patrick Ryan
*Assistant Examiner* — Ben Lewis
(74) *Attorney, Agent, or Firm* — Collard & Roe, P.C.

(57) ABSTRACT

Provided is a power storage device that enables a reduction in workload and work risk and thus allows a battery unit to be simply and safely removed from and attached to the power storage device.
A power storage device (1) includes a plurality of battery unit receiving portions (70) for receiving battery units (100), a plurality of connectors (20) each floatable in the plane intersecting a direction (X) of insertion of the battery unit (100) into the battery unit receiving portion (70), an attaching object (80) to which the plurality of connectors (20) are attached, and connecting members (93) that connect between the plurality of connectors (20).

38 Claims, 17 Drawing Sheets

(52) U.S. Cl.
CPC .......... *H01M 2/202* (2013.01); *H01R 13/514* (2013.01); *H01R 13/6315* (2013.01); *H01R 4/4863* (2013.01); *H01R 13/15* (2013.01); *H01R 13/447* (2013.01); *H01R 13/745* (2013.01)

(56) References Cited

U.S. PATENT DOCUMENTS

| | | | |
|---|---|---|---|
| 2009/0017701 A1* | 1/2009 | Ma | H01R 13/4361 439/752 |
| 2011/0065331 A1* | 3/2011 | Takagi | H01R 13/113 439/733.1 |
| 2013/0288543 A1 | 10/2013 | Higuchi et al. | |

FOREIGN PATENT DOCUMENTS

| | | |
|---|---|---|
| JP | 2003-257516 A | 9/2003 |
| JP | 2004-231024 A | 8/2004 |
| JP | 2006-294338 A | 10/2006 |
| JP | 2008-276991 A | 11/2008 |
| JP | 2012-038531 A | 2/2012 |
| JP | 2012-134063 A | 7/2012 |

OTHER PUBLICATIONS

International Search Report of PCT/JP2012/082036, mailed Feb. 12, 2013.

\* cited by examiner

POWER STORAGE DEVICE

CROSS REFERENCE TO RELATED APPLICATIONS

This application is the National Stage of PCT/JP2012/082036 filed on Dec. 11, 2012, which claims priority under 35 U.S.C. §119 of Japanese Application No. 2012-000167 filed on Jan. 4, 2012, the disclosure of which is incorporated by reference. The international application under PCT article 21(2) was not published in English.

TECHNICAL FIELD

This invention relates to a power storage device.

BACKGROUND ART

Conventionally, as shown in FIG. 33, there is known a device comprising a plurality of battery units 170 each having input and output terminals 170a, bus bars 154 connecting between the battery units 170, and nuts 180 attached to the input and output terminals 170a and fixing the bus bars 154 to the battery units 170 (see, e.g. Patent Document 1).

PRIOR ART DOCUMENT

Patent Document

Patent Document 1: JP-A-2003-257516

SUMMARY OF THE INVENTION

Problem to be Solved by the Invention

However, in the device of Patent Document 1, each time it becomes necessary to remove and attach the battery unit 170 from and to the device, for example, for repairing or replacing the battery unit 170, the bus bars 154 and the nuts 180 should be detached and attached, and therefore, there has been a problem that the time cost and the workload and work risk such as screw fixing failure for the removal and attachment of the battery unit 170 are large.

Therefore, this invention aims to solve the conventional problem, that is, it is an object of this invention to provide a power storage device that enables a reduction in workload and work risk and thus allows a battery unit to be simply and safely removed from and attached to the power storage device.

Means for Solving the Problem

A power storage device of the present invention comprises: a plurality of battery unit receiving portions for receiving battery units; a plurality of connectors each floatable in a plane intersecting a direction of insertion of the battery unit into the battery unit receiving portion; an attaching object to which the plurality of connectors are attached; and a connecting member that connects between the plurality of connectors, thereby solving the problem mentioned above.

The connecting member may be inserted into the connectors from a side opposite to the direction of insertion of the battery unit so as to be connected to the connectors.

Each connector may comprise a first housing that is attached to the attaching object, a second housing that is attached to the first housing and forms a contact receiving portion jointly with the first housing, and a contact that is at least partially received in the contact receiving portion, wherein the second housing is attached to the first housing so as to be movable relative to the first housing in the plane intersecting the direction of insertion of the battery unit, and wherein the contact is received in the contact receiving portion in a state where the contact is not fixed to the first housing or the second housing so as to be movable relative to the first housing and the second housing.

The contact may comprise a first contact portion that is disposed on the first housing side for contact with the connecting member.

The contact may comprise a second contact portion that is disposed on the second housing side for contact with a battery-side contact of a battery-side connector attached to the battery unit.

The first housing may comprise a first control portion that controls a position and posture of the contact in the contact receiving portion.

The second housing may comprise a second control portion that controls a position and posture of the contact in the contact receiving portion.

The contact may comprise a pair of conductive members facing each other and a biasing member provided between the pair of conductive members and biasing the pair of conductive members toward each other.

The power storage device may further comprise a signal connector that is attached to the second housing, wherein the signal connector moves along with the second housing relative to the first housing when the second housing moves relative to the first housing.

The power storage device may further comprise a cover that covers the connecting member in a state where the connecting member is attached to the connectors.

The power storage device may further comprise the battery units that are received in the battery unit receiving portions, wherein each battery unit comprises a battery incorporated in the battery unit and a battery-side connector connected to the battery, and wherein the battery-side connector is connected to the connector when the battery unit is received in the battery unit receiving portion.

The battery-side connector may comprise a pair of battery-side contacts one of which is connected to a positive electrode of the battery and the other of which is connected to a negative electrode of the battery.

The battery-side connector may comprise a battery-side housing, wherein the power storage device further comprises a battery-side signal connector attached to the battery-side housing, and wherein the battery-side signal connector is connected to a control circuit of the battery.

The battery-side signal connector may be connected to a signal connector attached to the connector when the battery unit is received in the battery unit receiving portion.

Effect of the Invention

According to this invention, a plurality of battery units are connected to each other by connectors and connecting members in the state where the battery units are inserted into battery unit receiving portions and, only by extraction and insertion operations of each battery unit with respect to the battery unit receiving portion, it is possible to remove and attach the battery unit from and to a power storage device. Therefore, the workload and work risk can be reduced so that each battery unit can be simply and safely removed from and attached to the power storage device.

Further, since each connector is configured to be floatable in the plane intersecting a direction of insertion of the battery unit, the position offset between the battery unit and the connector can be absorbed by the floating function of the connector. Therefore, even if the connector is disposed at a position which cannot be visually observed by a user, the battery unit and the connector can be reliably connected to each other.

MODE FOR CARRYING OUT THE INVENTION

Hereinbelow, embodiments of a power storage device of this invention and a plurality of modifications thereof will be described with reference to the drawings.

In the following description, a direction in which a battery unit is inserted into a receiving rack is defined as a first direction X, a direction perpendicular to the first direction X is defined as a second direction Y, and a direction perpendicular to the first direction X and the second direction Y is defined as a third direction Z.

Embodiments

Hereinbelow, a power storage device 1 according to one embodiment of this invention will be described with reference to the drawings.

Figure 1:
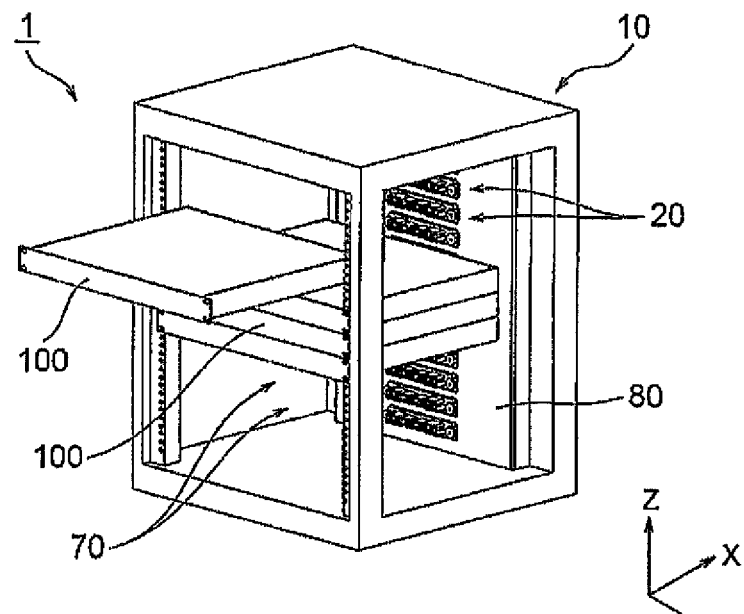
FIG. 1 is a perspective view, as seen from the front side, showing a power storage device according to a first embodiment of this invention.
Figure 2:
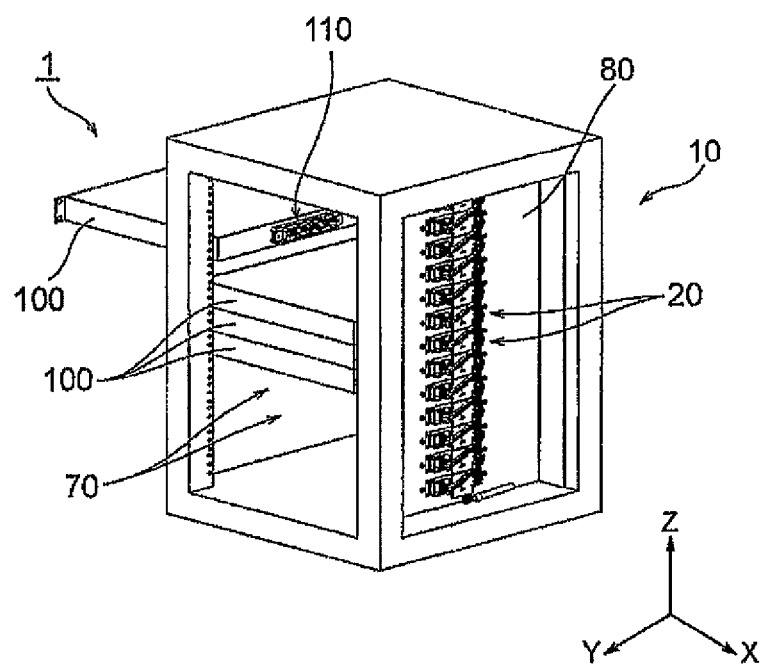
FIG. 2 is a perspective view, as seen from the rear side, showing the power storage device.

As shown in FIGS. 1 and 2, the power storage device 1 comprises a receiving rack 10 and a plurality of battery units 100 which are inserted into the receiving rack 10.

Figure 4:
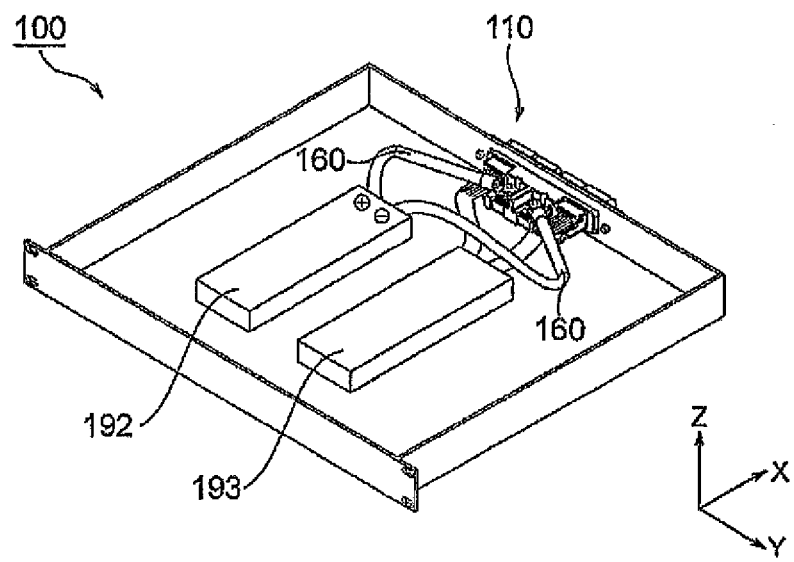
FIG. 4 is a perspective view showing a state where a battery-side connector is attached to a battery unit.
Figure 24:
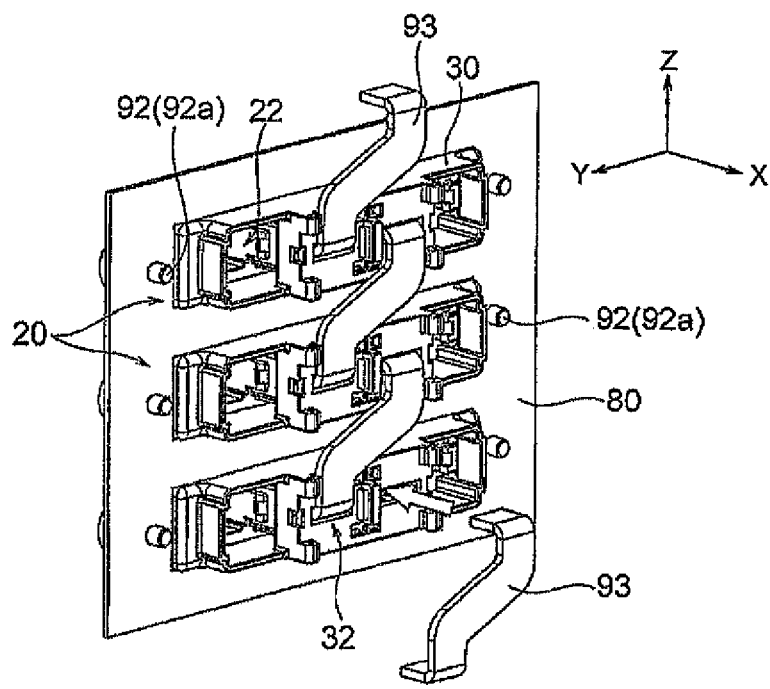
FIG. 24 is a perspective view showing a state of attaching a rack-side connecting member to the rack-side connector.

As shown in FIGS. 1 and 2, a plurality of rack-side connectors 20 connected to each other by rack-side connecting members 93 shown in FIG. 24 are attached to the receiving rack 10. As shown in FIG. 2, a battery-side connector 110 connected to a battery 192 by battery-side connecting members (cables with crimp terminals) 160 shown in FIG. 4 is attached to each of the battery units 100.

Consequently, the power storage device 1 is configured such that, as shown in FIGS. 1 and 2, when the plurality of battery units 100 are inserted into the receiving rack 10, the rack-side connectors 20 and the battery-side connectors 110 are fitted to each other, thereby establishing connection between the plurality of battery units 100 in which the batteries 192 are incorporated.

First, the structure of the receiving rack 10 attached with the rack-side connectors 20 in this embodiment will be described hereinbelow.

The receiving rack 10 comprises the plurality of rack-side connectors 20 attached to a rack-side attaching panel 80, rack-side signal connectors 60 detachably connected to the rack-side connectors 20, a plurality of battery unit receiving portions 70 for receiving the battery units 100, rack-side signal cables 91 connecting between the rack-side signal connectors 60, rack-side attaching members 92 attaching the rack-side connectors 20 to the rack-side attaching panel 80, the rack-side connecting members 93 connecting between rack-side contacts 50 of the plurality of rack-side connectors 20, and covers 94 detachably attached to the rack-side connectors 20.

As shown in FIGS. 1 and 2, when the battery unit 100 is inserted into the battery unit receiving portion 70 of the receiving rack 10, the rack-side connector 20 is fitted and connected to the battery-side connector 110 of the battery unit 100.

Figure 7:
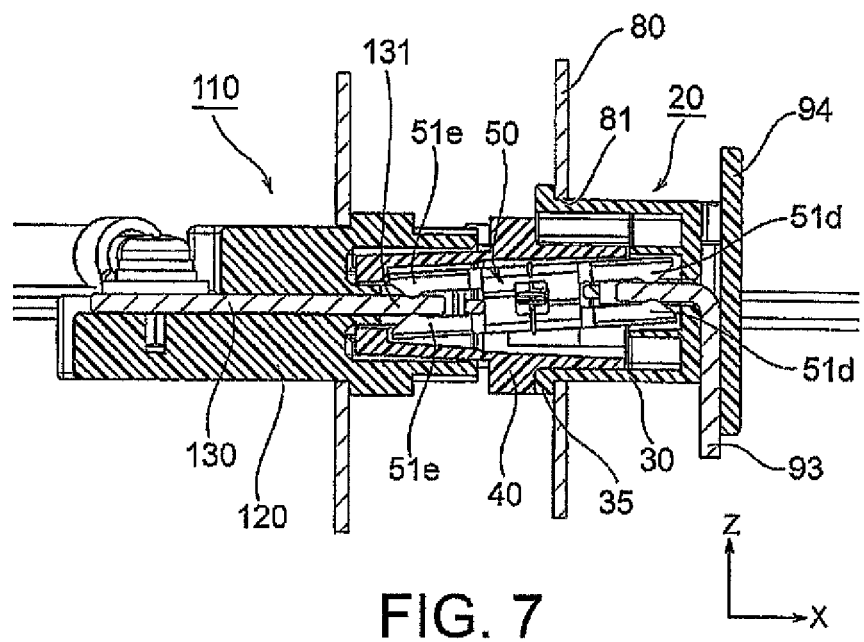
FIG. 7 is an explanatory diagram showing, in partial cross section, a state where the rack-side connector and the battery-side connector are fitted together.
Figure 8:
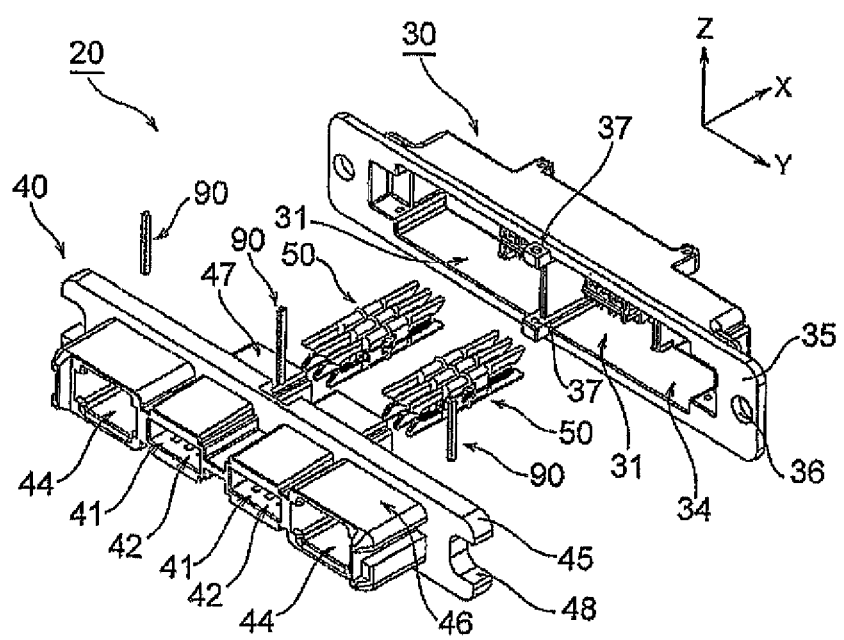
FIG. 8 is an exploded perspective view showing the rack-side connector.
Figure 9:
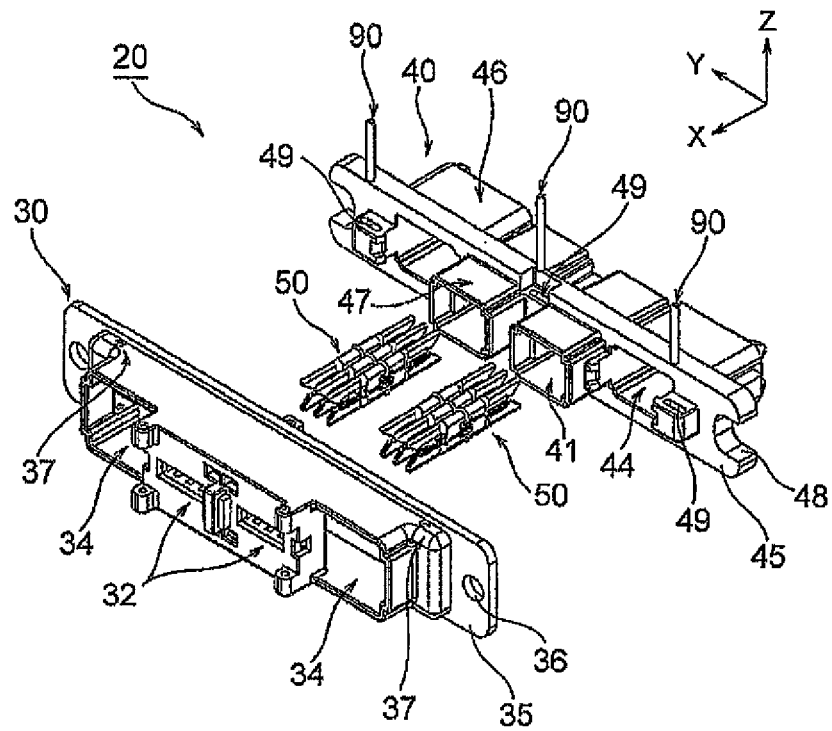
FIG. 9 is an exploded perspective view, as seen from a direction different from that in FIG. 8, showing the rack-side connector.

As shown in FIGS. 7, 8, and 9, each rack-side connector 20 comprises a first housing 30 fixed to the rack-side attaching panel 80, a second housing 40 floatably attached to the first housing 30, and the rack-side contacts 50 received in the first housing 30 and the second housing 40.

Figure 23:
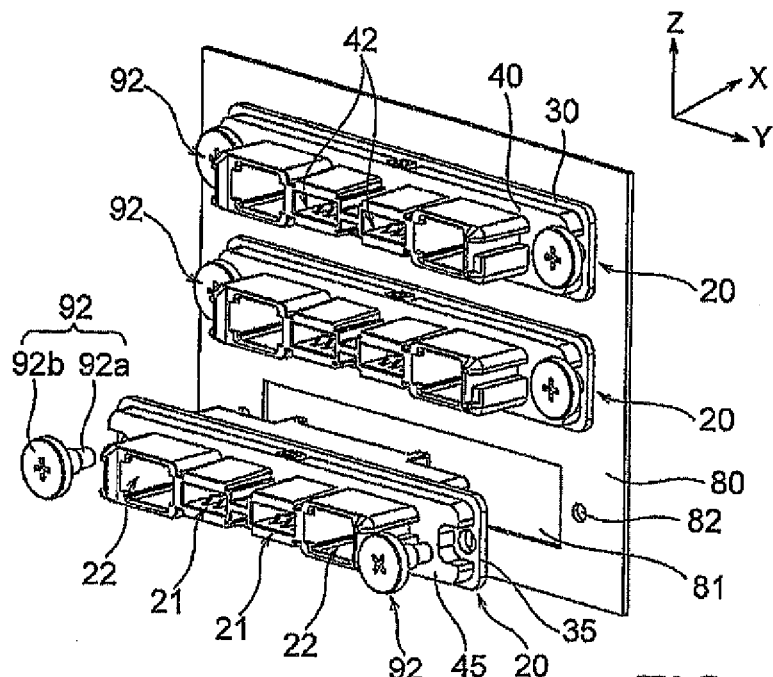
FIG. 23 is a perspective view showing a state of attaching the rack-side connector to a rack-side attaching panel of the receiving rack using rack-side attaching members.

The first housing 30 is formed of an insulating resin. As shown in FIGS. 7, 23, and 24, the first housing 30 is fitted into an attaching opening 81 of the rack-side attaching panel 80 and fixed to the rack-side attaching panel 80 by the rack-side attaching members 92 in the state where the first housing 30 partially protrudes on both sides, in the first direction X, of the rack-side attaching panel 80.

The first housing 30 integrally has first contact receiving portions 31 each partially receiving the rack-side contacts 50, first insertion openings 32 each for insertion of the rack-side connecting member 93 into the rack-side connector 20, first control portions 33 each controlling the position and posture of the rack-side contacts 50, first signal connector receiving portions 34 each for receiving part of the rack-side signal connector 60, a first flange portion 35 formed so as to project in the second direction Y and the third direction Z, attaching member holes 36 each for insertion of a shaft portion 92a of the rack-side attaching member 92, and first locking member holes 37 for insertion of rack-side locking members 90.

Figure 12:
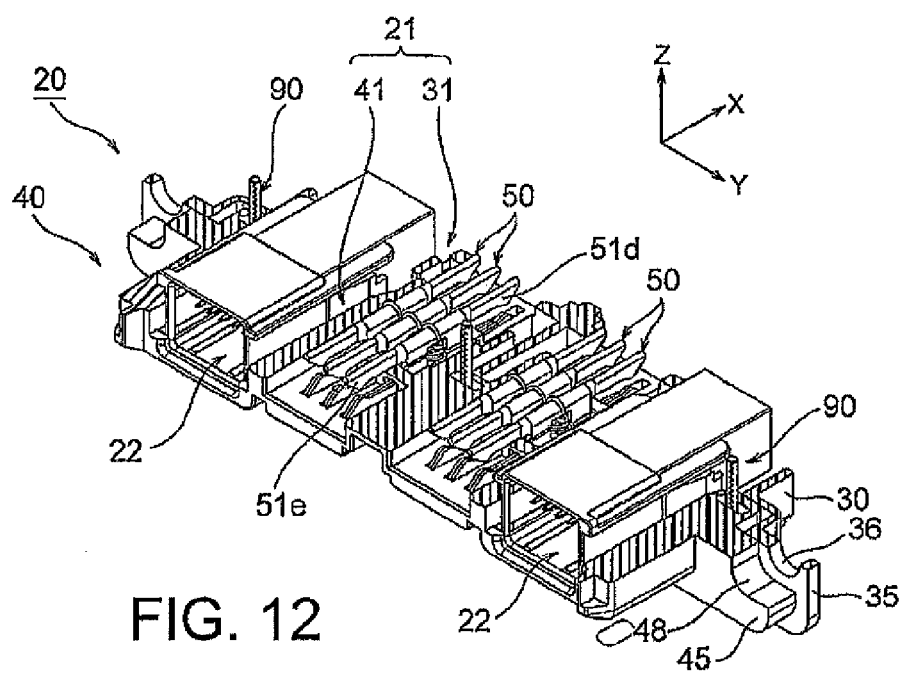
FIG. 12 is an explanatory diagram showing the rack-side connector in partial cross section on an X-Y plane.
Figure 14:
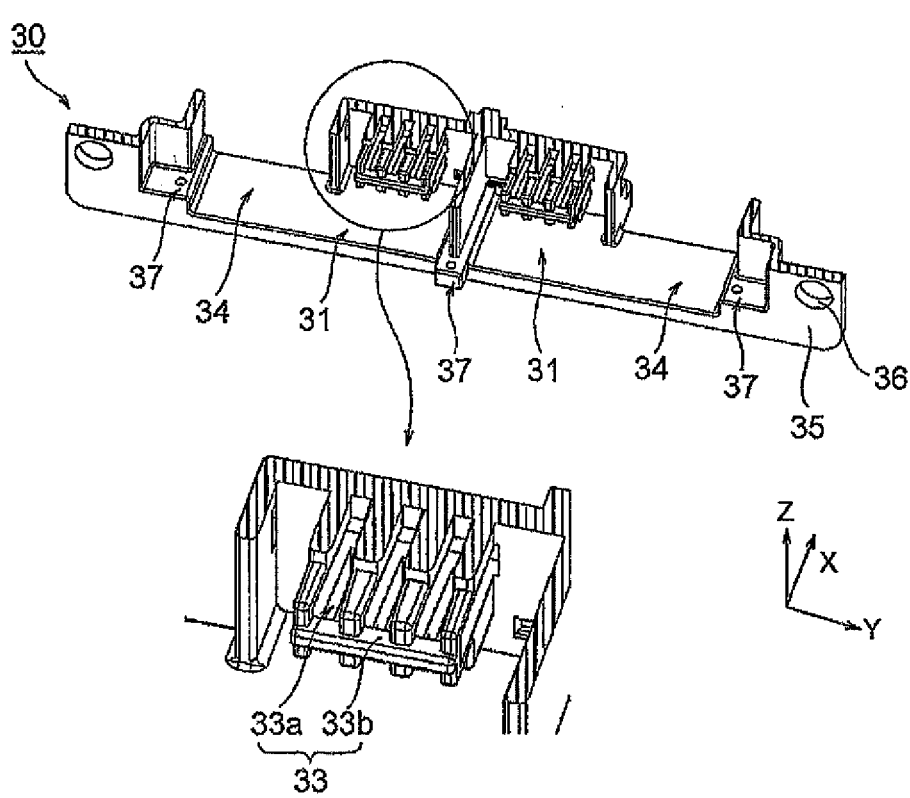
FIG. 14 is an explanatory diagram showing, in cross section, the first housing of the rack-side connector with its part enlarged in scale.

As shown in FIGS. 8 and 14, the two first contact receiving portions 31 are formed and arranged side by side in the second direction Y in the state where the two first contact receiving portions 31 are partitioned from each other by an intermediate wall. Each first contact receiving portion 31 forms a rack-side contact receiving portion 21 jointly with a second contact receiving portion 41 formed in the second housing 40. In this embodiment, as shown in FIG. 12, the rack-side contacts 50 in a set of three are received in each rack-side contact receiving portion 21. The number of the rack-side contacts 50 received in each rack-side contact receiving portion 21 may be any number as long as it is one or more.

Figure 5:
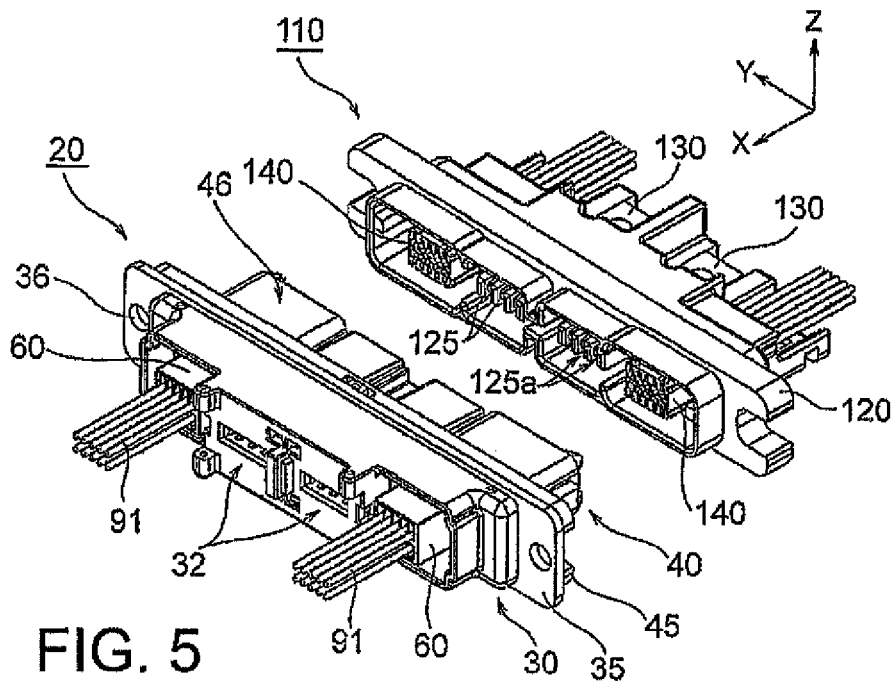
FIG. 5 is a perspective view showing a state where the rack-side connector and the battery-side connector face each other.

As shown in FIGS. 5 and 9, each first insertion opening 32 is an opening for allowing insertion of the rack-side connecting member 93 into the rack-side connector 20 from the rear side in the first direction X. The two first insertion openings 32 are formed and arranged side by side in the second direction Y in the state where the two first insertion openings 32 are partitioned from each other by an intermediate wall. The first insertion openings 32 respectively communicate with the first contact receiving portions 31.

Figure 16:
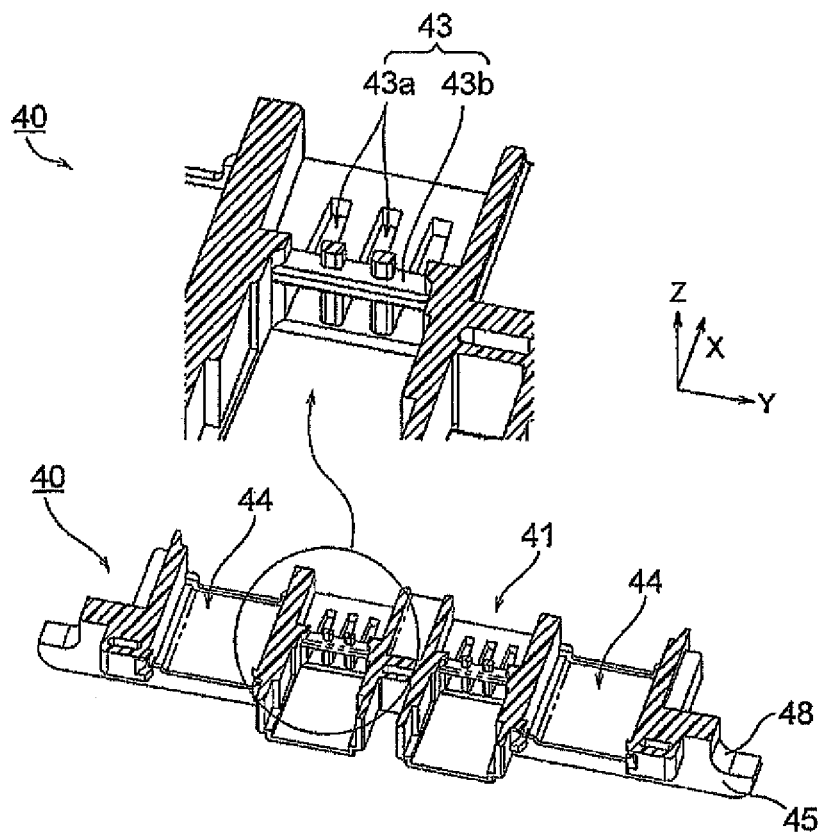
FIG. 16 is an explanatory diagram showing, in cross section, the second housing of the rack-side connector with its part enlarged in scale.

As shown in FIGS. 14 and 16, each first control portion 33 is a portion that, jointly with a second control portion 43 formed in the second housing 40, controls the position and posture of the rack-side contacts 50 in the rack-side contact receiving portion 21.

As shown in FIG. 7, the first control portion 33 controls the positional relationship between the first insertion opening 32 formed in the first housing 30 and first contact portions 51d of the rack-side contacts 50 so that the rack-side connecting member 93 inserted from the first insertion opening 32 can enter between the first contact portions 51d of the rack-side contacts 50 regardless of the positional relationship between the first housing 30 and the second housing 40.

Figure 17:
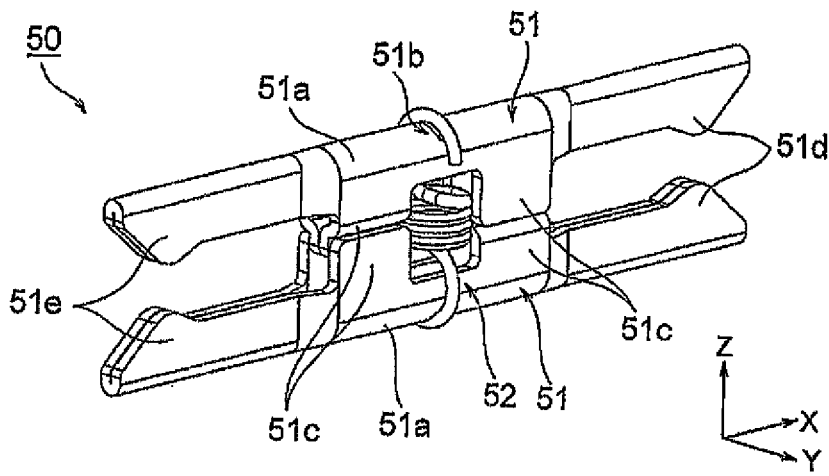
FIG. 17 is a perspective view showing the rack-side contact.
Figure 18:
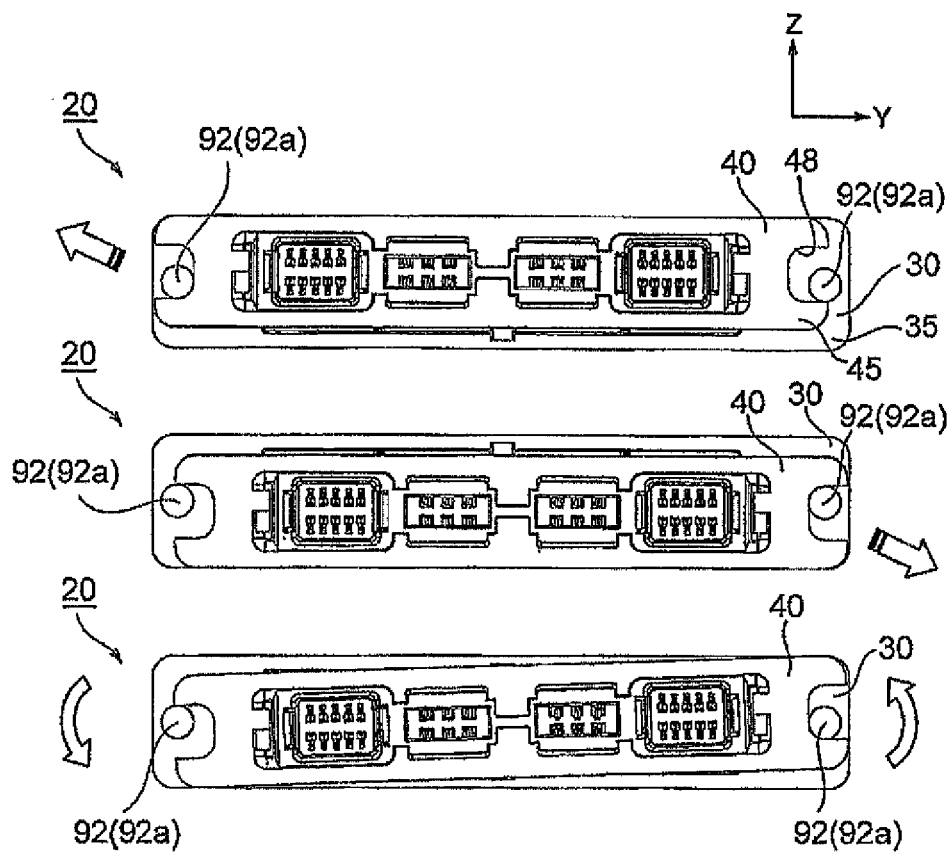
FIG. 18 is an explanatory diagram, as seen from a first direction, showing the manner in which the second housing moves relative to the first housing in the rack-side connector.
Figure 19:
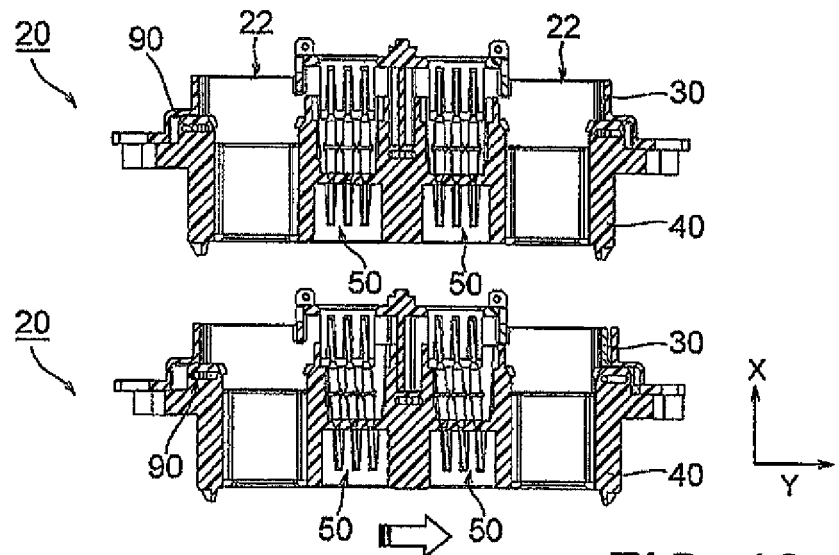
FIG. 19 is an explanatory diagram, as seen from a third direction, showing the manner in which the second housing moves relative to the first housing in the rack-side connector.
Figure 20:
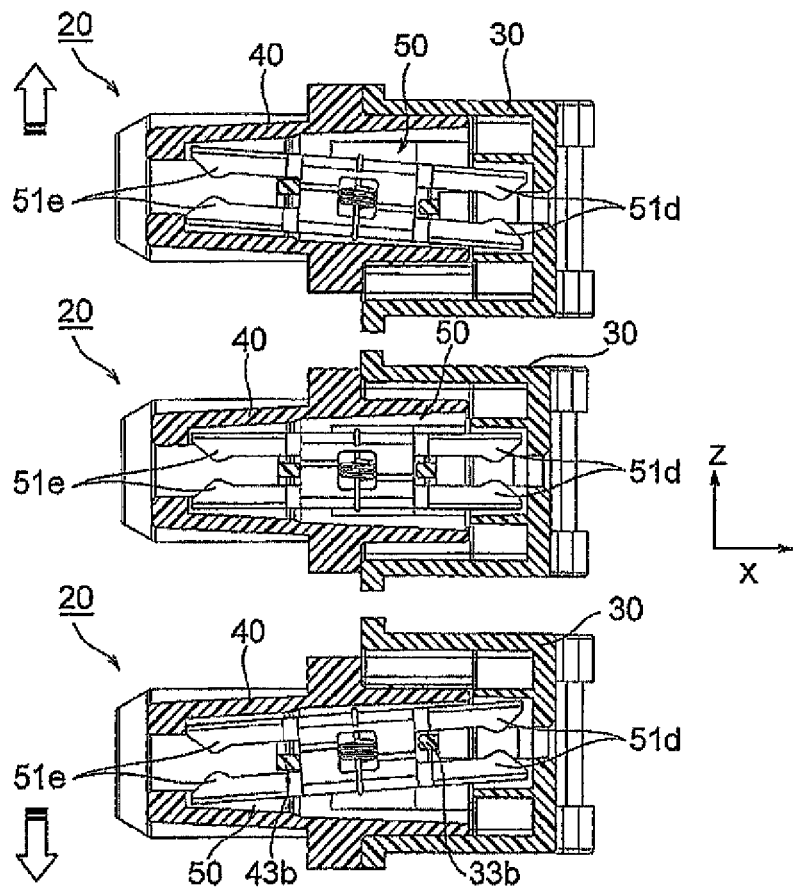
FIG. 20 is an explanatory diagram, as seen from a second direction, showing the manner in which the second housing moves relative to the first housing in the rack-side connector.

In this embodiment, as shown in FIGS. 14, 17, and 20, the first control portion 33 comprises first portions 33a each of which allows insertion of part of the rack-side contact 50 (the first contact portion 51d side of the rack-side contact 50) in the first direction X and surrounds the part of the rack-side contact 50 from both sides in the second direction Y and both sides in the third direction Z, and a second portion 33b that is interposed between a pair of conductive members 51 of each rack-side contact 50 in a region between support portions 51c and the first contact portions 51d of each rack-side contact 50 in the first direction X.

The movement of the rack-side contacts 50 toward both sides in the second direction Y and both sides in the third direction Z is restricted by the first portions 33a of the first control portion 33. Further, the movement of the rack-side contacts 50 in the first direction X is restricted by the second portion 33b of the first control portion 33.

Figure 21:
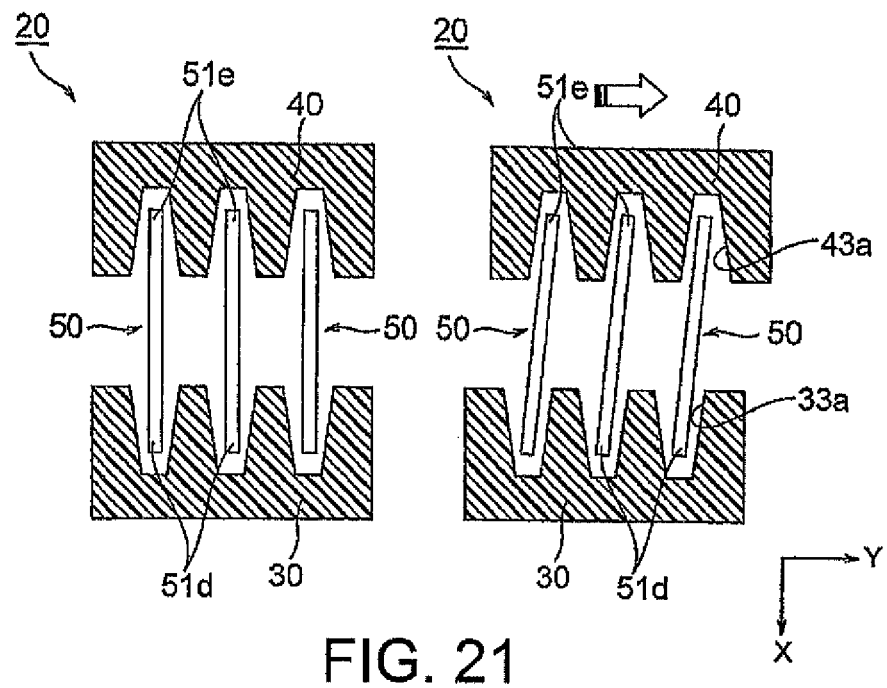
FIG. 21 is an explanatory diagram, as seen from the third direction, schematically showing a state of a first control portion, a second control portion, and the rack-side contacts when the second housing moves relative to the first housing in the rack-side connector.
Figure 22:
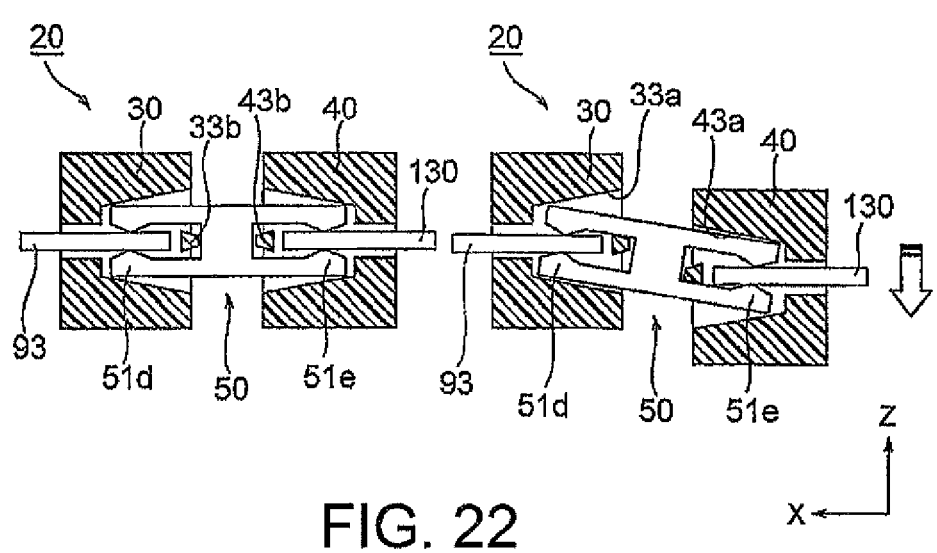
FIG. 22 is an explanatory diagram, as seen from the second direction, schematically showing a state of the first control portion, the second control portion, and the rack-side contact when the second housing moves relative to the first housing in the rack-side connector.

As shown in FIGS. 21 and 22, each first portion 33a of the first control portion 33 is configured such that the width dimensions in the second direction Y and the third direction Z of its portion that controls the position of the first contact portions 51d of the rack-side contact 50 (its portion corresponding to the first contact portions 51d of the rack-side contact 50) are set smaller than the width dimensions in the second direction Y and the third direction Z of its frontage portion that allows insertion of the rack-side contact 50.

Consequently, it is possible to ensure the large movement amount of the second housing 40 relative to the first housing 30 by avoiding physical interference between the frontage portion of each first portion 33a and the rack-side contact 50 and, further, it is possible to accurately control the position of the first contact portions 51d of each rack-side contact 50 in the second direction Y and the third direction Z.

Further, in this embodiment, as shown in FIGS. 21 and 22, each first portion 33a of the first control portion 33 is formed tapered so that its widths in the second direction Y and the third direction Z gradually decrease from its frontage portion along the first direction X. Consequently, each rack-side contact 50 can be smoothly attached to the first control portion 33.

The specific configuration of the first control portion 33 is not limited to the above. It may have any configuration as long as it is formed in the first housing 30 and can control the position and posture of each rack-side contact 50 in the rack-side contact receiving portion 21.

Figure 13:
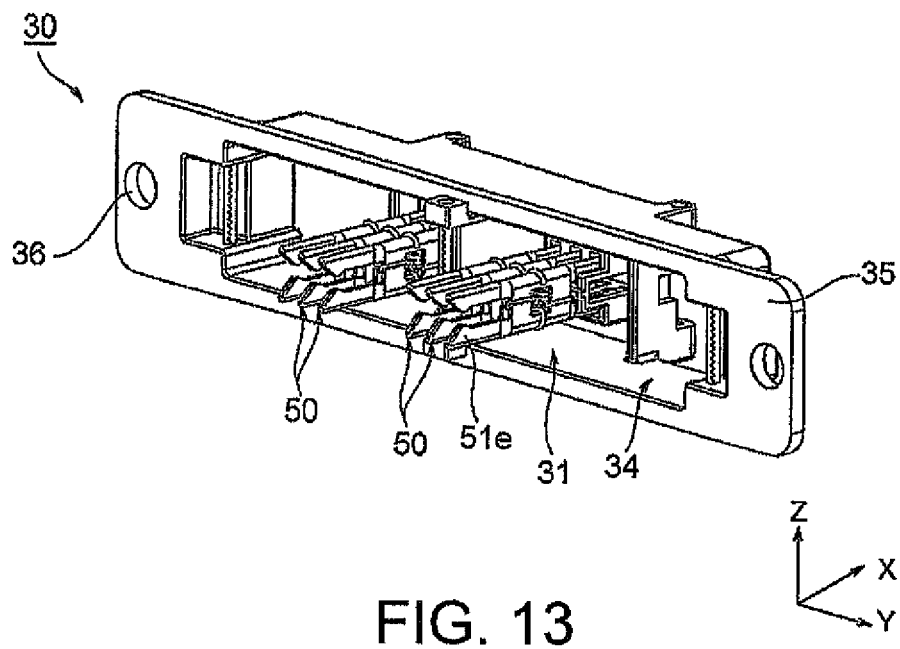
FIG. 13 is a perspective view showing a state where rack-side contacts are incorporated in a first housing of the rack-side connector.

Each first signal connector receiving portion 34 is a portion that receives part of the rack-side signal connector 60. As shown in FIGS. 8, 13, and 14, the two first signal connector receiving portions 34 are formed on both outer sides, in the second direction Y, of the two first contact receiving portions 31. Each first signal connector receiving portion 34 forms a rack-side signal connector receiving portion 22 jointly with a second signal connector receiving portion 44 formed in the second housing 40.

As shown in FIGS. 8 and 9, the first flange portion 35 is formed on the front end side, in the first direction X, of the first housing 30 so as to project in the second direction Y and the third direction Z. In the assembled state of the rack-side connector 20, the first flange portion 35 is held between a second flange portion 45 formed in the second housing 40 and the rack-side attaching panel 80 in the first direction X.

As shown in FIGS. 8 and 9, the attaching member holes 36 are formed in the first flange portion 35 on both end sides, in the second direction Y, of the first housing 30.

As shown in FIGS. 8 and 9, the first locking member holes 37 are holes for allowing insertion of the rack-side locking members 90 and fixing both ends of the inserted rack-side locking members 90. As shown in FIGS. 8 and 9, the upper and lower first locking member holes 37 are formed in pairs in the middle and on both sides, in the second direction Y, of the first housing 30.

The second housing 40 is formed of an insulating resin. The second housing 40 is attached to the first housing 30 in the state where the second housing 40 is movable relative to the first housing 30 in the plane perpendicular to the first direction X, i.e. in the state where the second housing 40 is movable relative to the first housing 30 in the second direction Y and the third direction Z.

The manner of the attachment between the first housing 30 and the second housing 40 will be described in detail. First, as shown in FIGS. 8 and 9, rear-side fitting portions 47, located more in the first direction X with respect to the second flange portion 45, of the second housing 40 are inserted in the first housing 30 in the first direction X. There is play (clearance) in the second direction Y and the third direction Z between the rear-side fitting portions 47, inserted in the first housing 30, of the second housing 40 and inner walls of the first housing 30. Consequently, the second housing 40 is movable in the second direction Y and the third direction Z relative to the first housing 30 while the movement of the second housing 40 in the second direction Y and the third direction Z is limited to fixed amounts.

As shown in FIG. 23, the first housing 30 and the second housing 40 are attached to the rack-side attaching panel 80 in the first direction X by the rack-side attaching members 92 each common to the attaching member hole 36 of the first housing 30 and an attaching member recess 48 of the second housing 40. Each rack-side attaching member 92 has a flange portion 92b. Consequently, the second housing 40 is held between the first housing 30 and the flange portions 92b in the first direction X so that its movement in the first direction X is restricted.

Further, as shown in FIGS. 8 and 9, the rack-side locking members 90 are each inserted along the third direction Z into the first locking member holes 37 of the first housing 30 and a second locking member hole 49 of the second housing 40. Consequently, the movement of the second housing 40 in the first direction X is restricted by the rack-side locking members 90.

The second housing 40 integrally has the second contact receiving portions 41 each partially receiving the rack-side contacts 50, second insertion openings 42 each for insertion of a battery-side contact 130 of the battery-side connector 110 into the rack-side connector 20, the second control portions 43 each controlling the position and posture of the rack-side contacts 50, the second signal connector receiving portions 44 each for receiving part of the rack-side signal connector 60, the second flange portion 45 formed so as to project in the second direction Y and the third direction Z, front-side fitting portions 46 which are fitted into a battery-side housing 120 when the rack-side connector 20 and the battery-side connector 110 are fitted together, the rear-side fitting portions 47 which are fitted into the first housing 30 in the assembled state of the rack-side connector 20, the attaching member recesses 48 each for insertion of the shaft portion 92a of the rack-side attaching member 92, and the second locking member holes 49 each for insertion of the rack-side locking member 90.

As shown in FIGS. 8 and 9, the two second contact receiving portions 41 are formed and arranged side by side in the second direction Y in the state where the two second contact receiving portions 41 are partitioned from each other by an intermediate wall. Each second contact receiving portion 41 forms the rack-side contact receiving portion 21 jointly with the first contact receiving portion 31 formed in the first housing 30.

Figure 10:
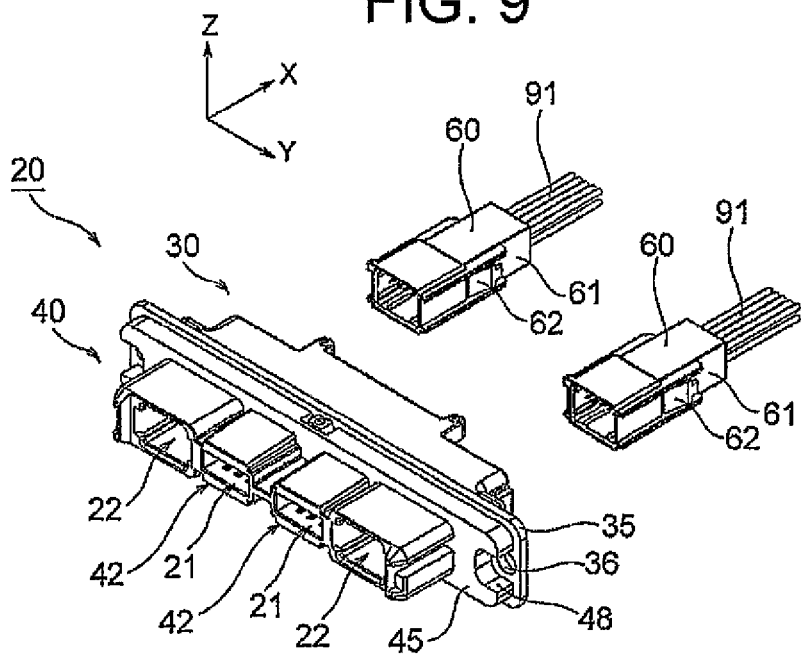
FIG. 10 is a perspective view showing the rack-side connector before rack-side signal connectors are attached thereto.
Figure 11:
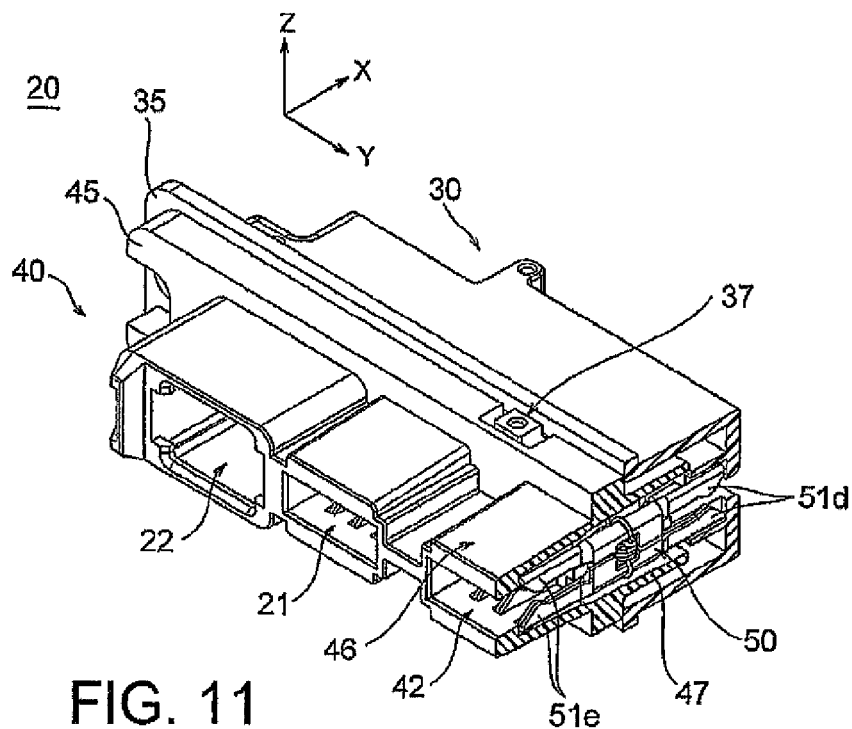
FIG. 11 is an explanatory diagram showing the rack-side connector in partial cross section on an X-Z plane.

As shown in FIGS. 8 and 10, each second insertion opening 42 is an opening for allowing insertion of the battery-side contact 130 as a pin contact (and a coating portion 125 of the battery-side housing 120) into the rack-side connector 20 from the front side in the first direction X. The two second insertion openings 42 are formed and arranged side by side in the second direction Y in the state where the two second insertion openings 42 are partitioned from each other by an intermediate wall. The second insertion openings 42 respectively communicate with the second contact receiving portions 41.

As shown in FIGS. 14 and 16, each second control portion 43 is a portion that, jointly with the first control portion 33 formed in the first housing 30, controls the position and posture of the rack-side contacts 50 in the rack-side contact receiving portion 21.

As shown in FIG. 7, the second control portion 43 controls the positional relationship between the second insertion opening 42 formed in the second housing 40 and second contact portions 51e of the rack-side contacts 50 so that the battery-side contact 130 (to be exact, portions, which are not covered by the coating portion 125, of the battery-side contact 130) inserted from the second insertion opening 42 can enter between the second contact portions 51e of the rack-side contacts 50 regardless of the positional relationship between the first housing 30 and the second housing 40. As shown in FIG. 5, the battery-side contact 130 is, near its contact portions 131, partially covered by the coating portion 125 which is for electric shock prevention and is formed in the battery-side housing 120. The coating portion 125 is formed in a comb shape and has a plurality of slits 125a formed at a predetermined interval in the second direction Y. The portions, not covered by the coating portion 125, of the battery-side contact 130, i.e. the portions, exposed to the outside corresponding to the slits 125a, of the battery-side contact 130, serve as the contact portions 131 of the battery-side contact 130.

In this embodiment, as shown in FIGS. 16, 17, and 20, the second control portion 43 comprises first portions 43a each of which allows insertion of part of the rack-side contact 50 (the second contact portion 51e side of the rack-side contact 50) from the side opposite to the first direction X and surrounds the part of the rack-side contact 50 from both sides in the second direction Y and both sides in the third direction Z, and a second portion 43b that is interposed between the pair of conductive members 51 in a region between the support portions 51c and the second contact portions 51e of each rack-side contact 50 in the first direction X.

The movement of the rack-side contacts 50 toward both sides in the second direction Y and both sides in the third direction Z is restricted by the first portions 43A of the second control portion 43. Further, the movement of the rack-side contacts 50 toward the side opposite to the first direction X is restricted by the second portion 43B of the second control portion 43.

As shown in FIGS. 21 and 22, each first portion 43a of the second control portion 43 is configured such that the width dimensions in the second direction Y and the third direction Z of its portion that controls the position of the second contact portions 51e of the rack-side contact 50 (its portion corresponding to the second contact portions 51e of the rack-side contact 50) are set smaller than the width dimensions in the second direction Y and the third direction Z of its frontage portion that allows insertion of the rack-side contact 50.

Consequently, it is possible to ensure the large movement amount of the second housing 40 relative to the first housing 30 by avoiding physical interference between the frontage portion of each first portion 43a and the rack-side contact 50 and, further, it is possible to accurately control the position of the second contact portions 51e of each rack-side contact 50 in the second direction Y and the third direction Z.

Further, in this embodiment, as shown in FIGS. 21 and 22, each first portion 43a of the second control portion 43 is formed tapered so that its widths in the second direction Y and the third direction Z gradually decrease from its frontage portion toward the side opposite to the first direction X. Consequently, each rack-side contact 50 can be smoothly attached to the second control portion 43.

The specific configuration of the second control portion 43 is not limited to the above. It may have any configuration as long as it is formed in the second housing 40 and can control the position and posture of each rack-side contact 50 in the rack-side contact receiving portion 21.

Figure 15:
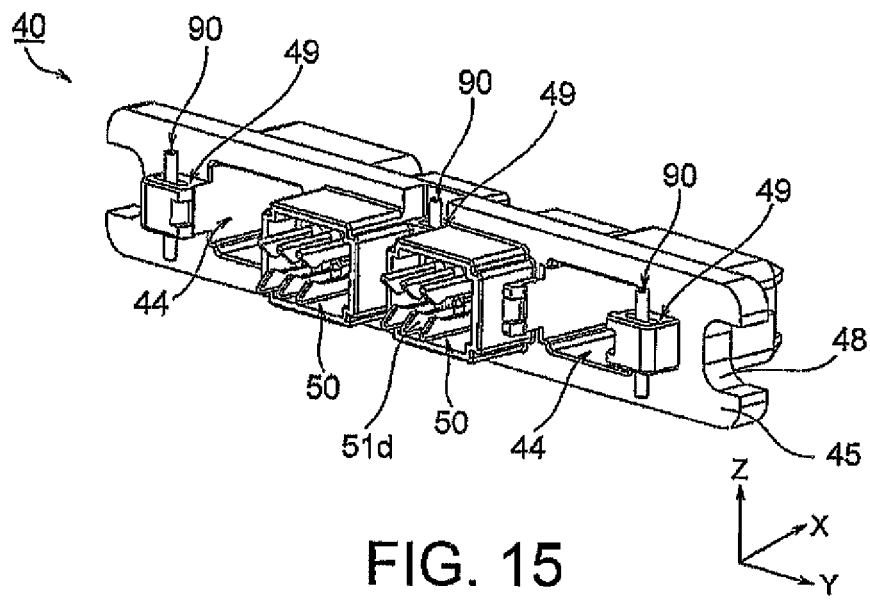
FIG. 15 is a perspective view showing a state where the rack-side contacts are incorporated in a second housing of the rack-side connector.

Each second signal connector receiving portion 44 is a portion that receives part of the rack-side signal connector 60. As shown in FIGS. 9, 15, and 16, the two second signal connector receiving portions 44 are formed on both outer sides, in the second direction Y, of the two second contact receiving portions 41. Each second signal connector receiving portion 44 forms the rack-side signal connector receiving portion 22 jointly with the first signal connector receiving portion 34 formed in the first housing 30.

As shown in FIGS. 8 and 9, the second flange portion 45 is formed so as to project in the second direction Y and the third direction Z from its outer surface. In the assembled state of the rack-side connector 20, the second flange portion 45 faces, in the first direction X, the first flange portion 35 formed in the first housing 30. In the assembled state of the rack-side connector 20, the second flange portion 45 is held between the first flange portion 35 and the flange portions 92b of the rack-side attaching members 92 in the first direction X so that the movement of the second housing 40 in the first direction X is restricted.

Figure 6:
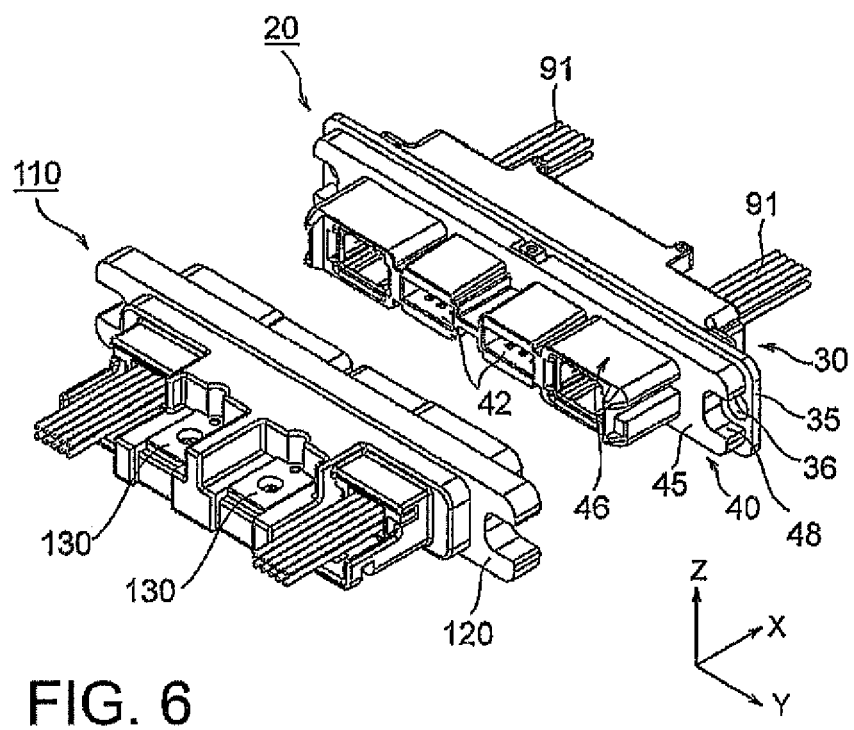
FIG. 6 is a perspective view, as seen from a direction different from that in FIG. 5, showing the state where the rack-side connector and the battery-side connector face each other.

As shown in FIGS. 5 and 6, the front-side fitting portions 46 are portions that are fitted into the battery-side housing 120 when the rack-side connector 20 and the battery-side connector 110 are fitted together. The front-side fitting portions 46 are formed more on the side opposite to the first direction X with respect to the second flange portion 45 and are inserted into the battery-side housing 120 when the rack-side connector 20 and the battery-side connector 110 are fitted together.

As shown in FIGS. 8 and 9, the rear-side fitting portions 47 are portions that are fitted into the first housing 30 in the assembled state of the rack-side connector 20. The rear-side fitting portions 47 are formed more in the first direction X with respect to the second flange portion 45 and are inserted into the first housing 30 in the assembled state of the rack-side connector 20.

The attaching member recesses 48 are recesses each for insertion of the shaft portion 92a of the rack-side attaching member 92. As shown in FIGS. 8 and 9, the attaching member recesses 48 are formed in the second flange portion 45 on both end sides, in the second direction Y, of the second housing 40.

As shown in FIG. 9, the second locking member holes 49 are holes each for insertion of the rack-side locking member 90. In each second locking member hole 49, the dimension in the second direction Y is set longer than the dimension in the first direction X. In this embodiment, each second locking member hole 49 is formed as an elongated hole. Each rack-side locking member 90 is inserted through the second locking member hole 49 with play (clearance) therebetween in the second direction Y. Consequently, the movement of the second housing 40 relative to the first housing 30 is not impeded by the rack-side locking members 90.

Each rack-side contact 50 is a socket contact for power supply. As shown in FIG. 12, the rack-side contacts 50, in a set of three, are arranged side by side in the second direction Y in each rack-side contact receiving portion 21 of the rack-side connector 20. Each rack-side contact 50 is received with play (clearance) with respect to any members including the first housing 30 and the second housing 40. In other words, each rack-side contact 50 is not fixed to any members including the first housing 30 and the second housing 40.

As shown in FIG. 17, each rack-side contact 50 comprises the pair of conductive members 51 and a biasing member 52 which is attached between the pair of conductive members 51 and biases the pair of conductive members 51 toward each other. In this embodiment, the biasing member 52 is in the form of a coil spring. However, its specific configuration is not limited thereto and, for example, it may be formed by an elastic member such as a rubber.

The pair of conductive members 51 are formed of an inelastic conductive metal (tough pitch copper, copper with a purity of about 99%) and have the same shape. In this embodiment, each conductive member 51 has a conductivity of 50% or more assuming that the conductivity of pure copper is 100%.

As shown in FIG. 17, each one of the conductive members 51 has a base portion 51a arranged spaced apart from that of the other one of the pair of conductive members 51, an attaching portion 51b formed at the base portion 51a and attached with the biasing member 52, the support portions 51c extending from the base portion 51a toward the other conductive member 51 to support the other conductive member 51 against a biasing force of the biasing member 52, and the first contact portion 51d and the second contact portion 51e respectively formed on both sides, in the first direction X, of the attaching portion 51b (and the support portions 51c).

As shown in FIG. 17, the support portions 51c respectively extend vertically in the third direction Z from each base portion 51a and are engaged with the support portions 51c of the other conductive member 51 so that the relative positions of one and the other of the conductive members 51 are restricted in the second direction Y.

As shown in FIG. 17, each rack-side contact 50 is configured such that, in the state where the biasing member 52 is attached to the pair of conductive members 51 and the support portions 51c of the pair of conductive members 51 are engaged with each other, the three-dimensional structure after the assembly is autonomously maintained. The relative position offset, in the first direction X, between the pair of conductive members 51 is suppressed by the spring force of the biasing member 52.

Each rack-side contact 50 is disposed in the state where the first contact portions 51d face each other and the second contact portions 51e face each other in the third direction Z. As shown in FIG. 7, each rack-side contact 50 is connected to the rack-side connecting member 93 by holding the rack-side connecting member 93 between the first contact portions 51d disposed in the first contact receiving portion 31 and is connected to the battery-side contact 130 by holding the battery-side contact 130 between the second contact portions 51e disposed in the second contact receiving portion 41.

As shown in FIGS. 21 and 22, the position of the rack-side contacts 50 in the second direction Y and the third direction Z in the rack-side contact receiving portion 21 is controlled by the first portions 33a of the first control portion 33 of the first housing 30 and the first portions 43a of the second control portion 43 of the second housing 40. As shown in FIG. 22, the position of the rack-side contacts 50 in the first direction X in the rack-side contact receiving portion 21 is controlled by the second portion 33b of the first control portion 33 of the first housing 30 and the second portion 43b of the second control portion 43 of the second housing 40.

As shown in FIG. 17, the biasing member 52 is attached between the attaching portions 51b respectively formed in the pair of conductive members 51 and is disposed in a space defined by the base portions 51a and the support portions 51c respectively formed in the pair of conductive members 51 forming the rack-side contact 50.

When the battery unit 100 is inserted into the receiving rack 10, the rack-side signal connectors 60 are fitted to battery-side signal connectors 140 attached to the battery unit 100 and connected to a control circuit 193 of the battery 192 and transmit control signals such as power monitor signals thereto. The rack-side signal connectors 60 are detachably attached to the second housing 40 and, when the second housing 40 moves relative to the first housing 30, the rack-side signal connectors 60 move along with the second housing 40 relative to the first housing 30. Consequently, the rack-side signal connectors 60 and the battery-side signal connectors 140 can be reliably connected to each other. As shown in FIG. 10, each rack-side signal connector 60 comprises a rack-side signal housing 61 detachably attached to the rack-side connector 20 and rack-side signal contacts (not illustrated) held by the rack-side signal housing 61. The rack-side signal connector 60 is inserted into the rack-side signal connector receiving portion 22 of the rack-side connector 20 from the side opposite to the first direction X and is prevented from coming off in the first direction X by spring portions 62 formed in the rack-side signal housing 61. The rack-side signal contacts (not illustrated) are connected to the rack-side signal cables 91. In this embodiment, the two rack-side signal connectors 60 are attached to the single rack-side connector 20. However, the number of the rack-side signal connectors 60 may be any number. In this embodiment, the rack-side signal connectors 60 are configured to transmit different signals. While each rack-side signal connector 60 is detachably attached to the second housing 40 in this embodiment, it may be fixed to the second housing 40. In this case, the rack-side signal contacts (not illustrated) may be directly attached to the second housing 40 without providing the rack-side signal housing 61.

In this embodiment, in order to reduce the influence on the signals flowing in the rack-side signal connectors 60 due to a magnetic field caused by the current flowing in the rack-side contacts 50, the rack-side signal connectors 60 are disposed on both outer sides, in the second direction Y, of the two sets of the rack-side contacts 50 as shown in FIGS. 5 and 6. That is, since the influence on the signals due to the magnetic field caused by the current flowing in the two sets of the rack-side contacts 50 is the strongest between the two sets of the rack-side contacts 50 and the weakest on both outer sides of the two sets of the rack-side contacts 50, the rack-side signal connectors 60 are disposed on the outer sides of the two sets of the rack-side contacts 50 in this embodiment.

As shown in FIGS. 1 and 2, the plurality of battery unit receiving portions 70 are defined in the receiving rack 10 and serve as portions for receiving and supporting the battery units 100.

As shown in FIGS. 1 and 2, the rack-side attaching panel 80 is an attaching object for the rack-side connectors 20, which is disposed on the rear, in the first direction X, of the receiving rack 10. As shown in FIG. 23, the rack-side attaching panel 80 has the plurality of attaching openings 81 into which the rack-side connectors 20 are fitted, and a plurality of attaching member holes 82 each for passing the shaft portion 92a of the rack-side attaching member 92 therethrough.

As shown in FIGS. 8 and 9, the rack-side locking members 90 are each inserted along the third direction Z into the first locking member holes 37 formed in the first housing 30 and the second locking member hole 49 formed in the second housing 40, thereby restricting the relative movement between the first housing 30 and the second housing 40 in the first direction X. Both ends of each rack-side locking member 90 are fixed to the first locking member holes 37 of the first housing 30. Each rack-side locking member 90 has clearance with respect to the second locking member hole 49 so that the movement of the second housing 40 relative to the first housing 30 is not impeded by the rack-side locking members 90. In this embodiment, each rack-side locking member 90 is configured as a spring pin that reduces its diameter when a force is applied toward its inside from its outer peripheral side and expands its diameter when the force is released. However, its specific configuration is not limited thereto.

Figure 3:
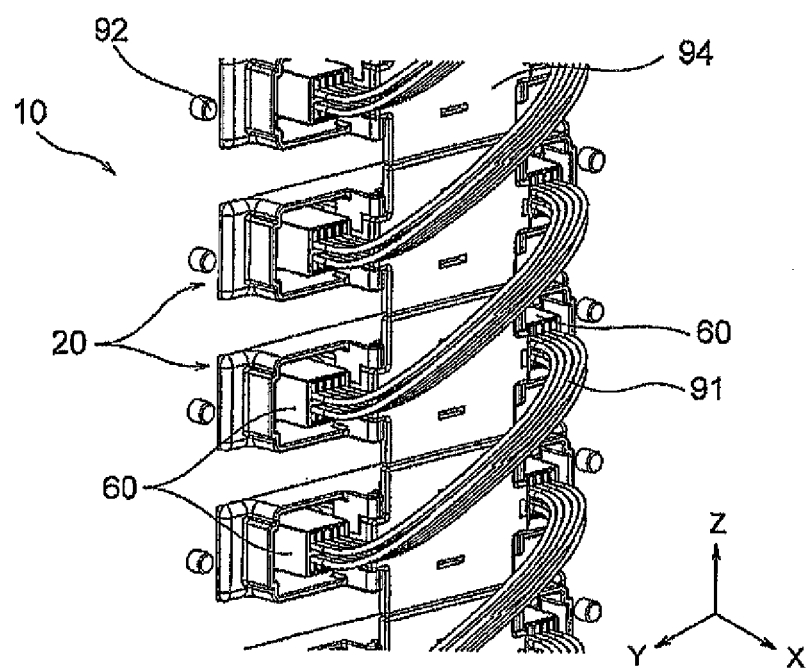
FIG. 3 is a perspective view showing a state where rack-side connectors are attached to a receiving rack.

As shown in FIG. 3, the rack-side signal cables 91 connect between the rack-side signal connectors 60 and, specifically, are connected to the rack-side signal contacts (not illustrated) of the rack-side signal connectors 60. The rack-side signal connectors 60 are connected to both ends of the rack-side signal cables 91.

As shown in FIG. 23, the rack-side attaching members 92 attach the rack-side connectors 20 to the rack-side attaching panel 80. Each rack-side attaching member 92 has the shaft portion 92a and the flange portion 92b formed at one end of the shaft portion 92a and having a diameter greater than that of the shaft portion 92a.

The shaft portion 92a of each rack-side attaching member 92 is passed through the attaching member recess 48 formed in the second housing 40, the attaching member hole 36 formed in the first housing 30, and the attaching member hole 82 formed in the rack-side attaching panel 80. The shaft portion 92a of each rack-side attaching member 92 has clearance particularly with respect to the attaching member recess 48 so that the movement of the second housing 40 relative to the first housing 30 is not impeded by the shaft portions 92a. In the assembled state of the rack-side connector 20, the flange portion 92b of each rack-side attaching member 92 is disposed on the front side, in the first direction X, of the second flange portion 45 formed in the second housing 40, thereby restricting the movement of the second housing 40 toward the front side in the first direction X. In this embodiment, each rack-side attaching member 92 is configured as a bolt. However, its specific configuration may be any configuration as long as it can attach the rack-side connector 20 to the rack-side attaching panel 80. For example, it may be a screw.

Figure 28:
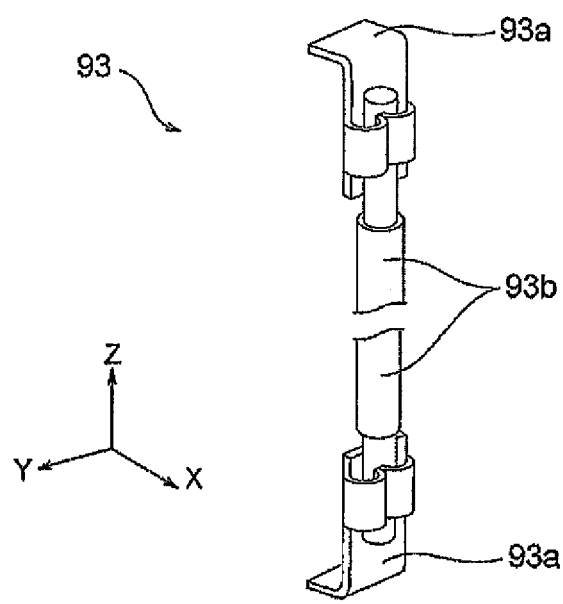
FIG. 28 is a perspective view showing a modification of the rack-side connecting member, which connects between the rack-side connectors.

As shown in FIG. 24, each rack-side connecting member 93 is connected at its one end to the rack-side contacts 50 of the rack-side connector 20 and at its other end to the rack-side contacts 50 of the other rack-side connector 20. In this embodiment, each rack-side connecting member 93 is configured as a bus bar. However, its specific configuration may be any configuration as long as it can connect between the rack-side contacts 50. For example, as shown in FIG. 28, each rack-side connecting member 93 may be a cable 93b with bus bar-like terminals 93a at its both ends. Common to this embodiment and its modification, at least portions, which are inserted into the rack-side connectors 20, of the rack-side connecting member 93 are formed in a flat plate shape. These portions, which are inserted into the rack-side connectors 20, of the rack-side connecting member 93 are each inserted into the rack-side connector 20 in the state where long sides of a section thereof are parallel to the second direction Y.

Figure 25:
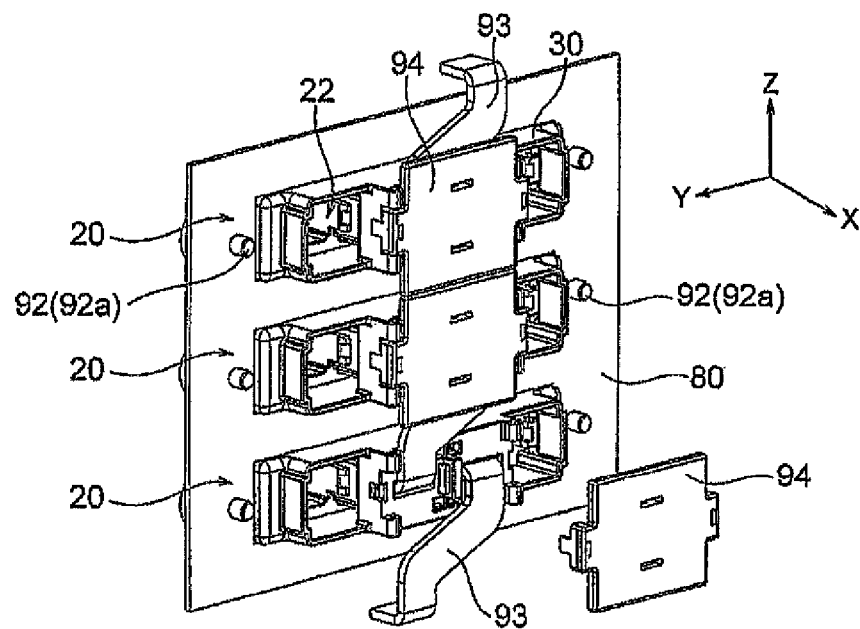
FIG. 25 is a perspective view showing a state of attaching a cover to the rack-side connector attached with the rack-side connecting members.
Figure 27:
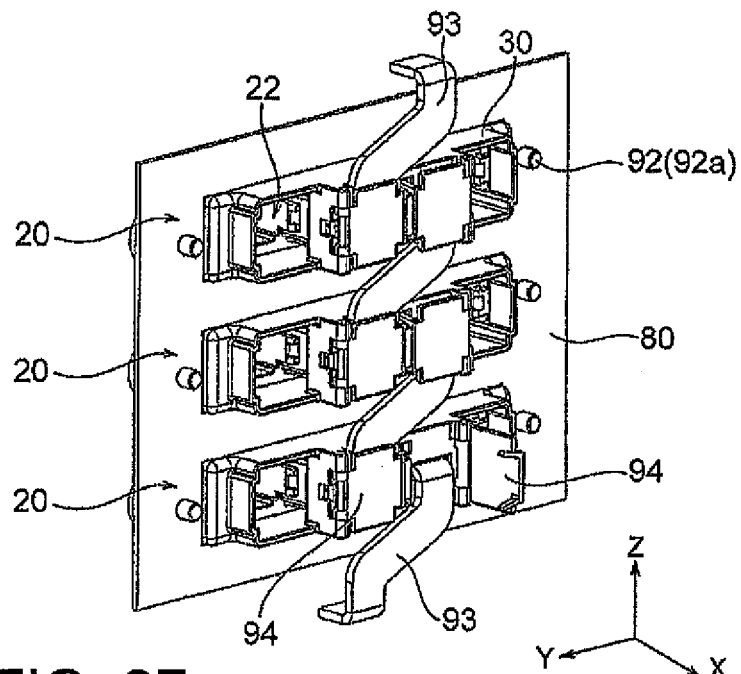
FIG. 27 is a perspective view showing a modification of the cover, which is attached to the rack-side connector.

As shown in FIG. 25, the covers 94 are detachably attached to the rack-side connectors 20, thereby preventing a user from receiving an electric shock by touching the rack-side connecting members 93, improving the insulation from the rack-side signal cables 91, preventing the rack-side connecting members 93 from coming off the rack-side connectors 20, and preventing foreign matter from entering the rack-side connectors 20. In this embodiment, one cover 94 is attached to each rack-side connector 20. However, the specific configuration of the cover 94 is not limited thereto. For example, as shown in FIG. 27, two covers 94 may be attached to each rack-side connector 20. In the modification shown in FIG. 27, the covers 94 are arranged side by side in the second direction Y corresponding to the left and right first insertion openings 32 arranged side by side in the second direction Y and are hinged to the first housing 30.

Next, an assembly method of the receiving rack 10 will be described hereinbelow.

First, as shown in FIG. 23, each rack-side connector 20 is fitted into the attaching opening 81 of the rack-side attaching panel 80 in the first direction X and then fixed to the rack-side attaching panel 80 by the rack-side attaching members 92.

Since the first housing 30 and the second housing 40 are attached to each other by the rack-side locking members 90 even in the state before the rack-side connector 20 is attached to the rack-side attaching panel 80 by the rack-side attaching members 92, there is no possibility of disassembly of the rack-side connector 20.

Then, as shown in FIG. 24, the rack-side connecting members 93 are inserted into the first insertion openings 32 of the first housings 30 from the side, opposite to the first direction X, of the rack-side attaching panel 80 and connected to the first contact portions 51d of the rack-side contacts 50. Specifically, as shown in FIG. 24, one end of each rack-side connecting member 93 is inserted into the right-side first insertion opening 32 of the rack-side connector 20 located above and the other end of each rack-side connecting member 93 is inserted into the left-side first insertion opening 32 of the rack-side connector 20 located below.

In this embodiment, the rack-side contacts 50 of the rack-side connectors 20 are connected to each other by the rack-side connecting members 93 as described above so that the rack-side connectors 20 are connected in series by the rack-side connecting members 93.

While the rack-side connectors 20 are connected in series by the rack-side connecting members 93 in this embodiment, the rack-side connectors 20 may be connected in parallel. Alternatively, the rack-side connectors 20 may be connected in series and parallel combination.

Figure 26:
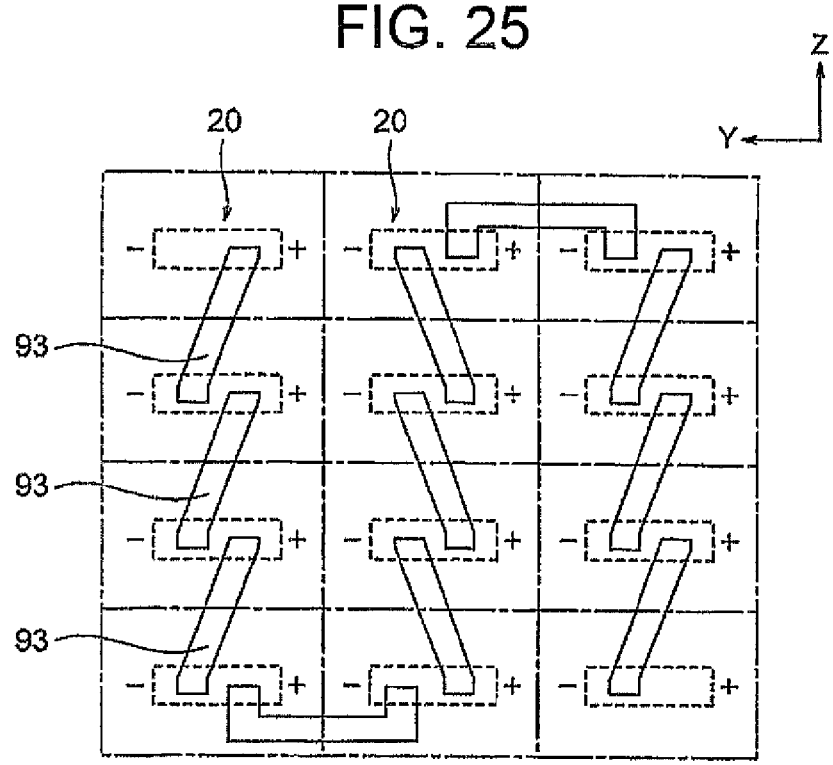
FIG. 26 is a schematic diagram exemplarily showing the manner of arrangement and connection of the rack-side connectors.

In this embodiment, as shown in FIG. 23, the rack-side connectors 20 are arranged side by side in one row along the third direction Z with respect to the rack-side attaching panel 80. However, the manner of the arrangement of the rack-side connectors 20 with respect to the rack-side attaching panel 80 is not limited thereto. For example, as shown in FIG. 26, the rack-side connectors 20 may be arranged in a matrix of N rows×M columns (second direction Y×third direction Z) with respect to the rack-side attaching panel 80. In the modification shown in FIG. 26, the rack-side connectors 20 are connected in series by the rack-side connecting members 93.

Then, as shown in FIG. 25, the covers 94 are attached to the rack-side connectors 20 from the side, opposite to the first direction X, of the rack-side attaching panel 80. By attaching the covers 94 to the rack-side connectors 20 in this manner, it is possible to prevent a user from receiving an electric shock by touching the rack-side connecting members 93 and to improve the insulation from the rack-side signal cables 91.

Then, as shown in FIGS. 10 and 12, the rack-side signal connectors 60 connected to the rack-side signal cables 91 are attached to the rack-side connectors 20 from the side, opposite to the first direction X, of the rack-side attaching panel 80. Specifically, as shown in FIG. 3, each rack-side signal connector 60 connected to one end of the rack-side signal cables 91 is inserted into the right-side rack-side signal connector receiving portion 22 of the rack-side connector 20 located above and each rack-side signal connector 60 connected to the other end of the rack-side signal cables 91 is inserted into the left-side rack-side signal connector receiving portion 22 of the rack-side connector 20 located below.

In this embodiment, the rack-side signal connectors 60 (and the rack-side signal cables 91) are attached to the rack-side connectors 20 as described above so that the rack-side connectors 20 are connected in series.

In this embodiment thus obtained, the plurality of battery units 100 are connected to each other by the rack-side connectors 20 and the rack-side connecting members 93 in the state where the battery units 100 are inserted into the battery unit receiving portions 70 and, only by extraction and insertion operations of each battery unit 100 with respect to the battery unit receiving portion 70, it is possible to remove and attach the battery unit 100 from and to the power storage device 1. Therefore, the workload and work risk can be reduced so that each battery unit 100 can be simply and safely removed from and attached to the power storage device 1.

Since each rack-side connector 20 is configured to be floatable in the plane intersecting the direction of insertion of the battery unit 100 (the first direction X), the position offset between the battery unit 100 and the rack-side connector 20 can be absorbed by the floating function of the rack-side connector 20. Therefore, even if the rack-side connector 20 is disposed at a position which cannot be visually observed by a user, the battery unit 100 and the rack-side connector 20 can be reliably connected to each other.

Since the rack-side connecting members 93 can be attached to the rack-side connectors 20 by inserting the rack-side connecting members 93 into the rack-side connectors 20 without using a screw, a bolt, or the like, it is possible to easily achieve the attachment of the rack-side connecting members 93 to the rack-side connectors 20.

The second housing 40 is attached to the first housing 30 so as to be movable relative to the first housing 30 in the plane perpendicular to the first direction X (the plane defined by the second direction Y and the third direction Z). The rack-side contacts 50 are disposed in each rack-side contact receiving portion 21 in the state where the position and posture of the rack-side contacts 50 are controlled by the first control portion 33 formed in the first housing 30 and the second control portion 43 formed in the second housing 40. Therefore, it is possible to move, following the movement of the second housing 40, the second contact portions 51e of the rack-side contacts 50 by the second control portion 43. Consequently, the floating amount (displacement amount) of the rack-side contacts 50 can be ensured to be large with the simple structure so that it is possible to allow the position offset between the second contact portions 51e and the battery-side contact 130, thereby improving the reliability of the connection between the second contact portions 51e and the battery-side contact 130.

Since the rack-side contacts 50 are received with play in each rack-side contact receiving portion 21 formed by the first housing 30 and the second housing 40, an additional component such as an attaching member is not required for the attachment of the rack-side contacts 50 with respect to the first housing 30 and the second housing 40. Therefore, the number of components is small and the workload for the attachment can be reduced.

Since the second housing 40 is provided so as to be movable relative to the first housing 30 in the second direction Y and each second control portion 43 that controls the position of the second contact portions 51e in the second direction Y is formed in the second housing 40, when the second housing 40 moves relative to the first housing 30 in the second direction Y, the second contact portions 51e also move in the second direction Y by the second control portion 43. Therefore, positions, that are brought into contact with the second contact portions 51e, on the battery-side contact 130 (i.e. positions of the contact portions 131 on the battery-side contact 130) can be limited.

By limiting the positions of the contact portions 131 on the battery-side contact 130 in this manner, positions, not brought into contact with the second contact portions 51e, on the battery-side contact 130 can be covered by the coating portion 125 so that it is possible to provide the battery-side contact 130 with an electric shock prevention function.

Since the positions of the contact portions 131 on the battery-side contact 130 are limited, even if the battery-side connector 110 is moved relative to the rack-side connector 20 in the second direction Y in the state where the battery-side contact 130 is held between the second contact portions 51e (i.e. the state where the rack-side connector 20 and the battery-side connector 110 are fitted together), the second contact portions 51e do not slide relative to the battery-side contact 130. Therefore, it is possible to reduce a force which is required for moving the battery-side connector 110 relative to the rack-side connector 20 in the second direction Y, and to prevent a force, when the battery-side connector 110 is caused to slide relative to the rack-side connector 20 in the second direction Y, from being transmitted to other constituent members of the rack-side connector 20 and the battery-side connector 110.

Next, a power storage device according to a second embodiment of this invention will be described with reference to FIGS. 29 to 31.

Herein, in the power storage device according to the second embodiment of this invention, the structure of a rack-side contact and the structures of a first control portion of a first housing and a second control portion of a second housing differ from those in the first embodiment. Hereinbelow, only the different points between the first embodiment and the second embodiment will be described.

First, the structure of a rack-side contact 50' in the second embodiment will be described hereinbelow.

As shown in FIG. 17, the rack-side contact 50 in the first embodiment comprises the pair of separately formed conductive members 51 and the biasing member 52.

Figure 29:
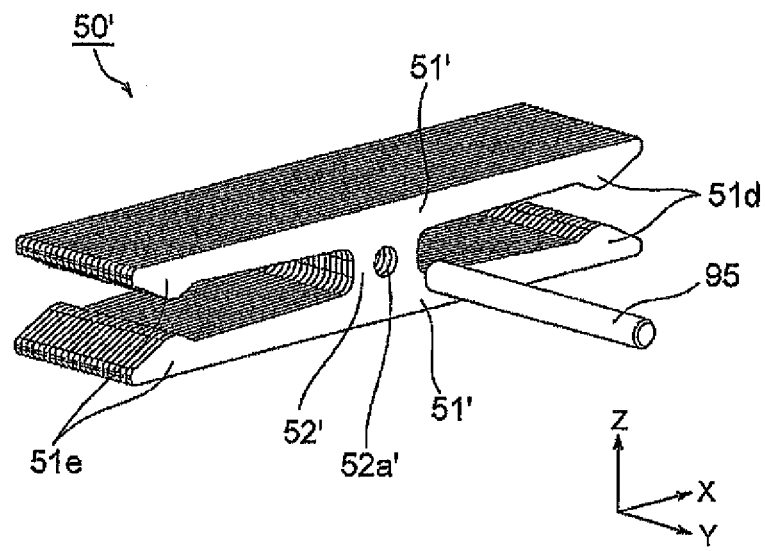
FIG. 29 is a perspective view showing a rack-side contact which forms a power storage device according to a second embodiment of this invention.

On the other hand, in the second embodiment, as shown in FIG. 29, the rack-side contact 50' is integrally formed by a pair of beam portions 51' arranged facing each other and a connecting portion 52' connecting between the pair of beam portions 51'. In the second embodiment, the rack-side contact 50' is formed of an elastic conductive metal.

As shown in FIG. 29, the pair of beam portions 51' each comprise a first contact portion 51d formed more in the first direction X with respect to the connecting portion 52' and a second contact portion 51e formed more on the side opposite to the first direction X with respect to the connecting portion 52'. The first contact portions 51d face each other and the second contact portions 51e face each other in the third direction Z.

As shown in FIG. 29, the connecting portion 52' has a hole 52a' formed along the second direction Y. A shaft member 95 is commonly passed through holes 52a' of connecting portions 52' of a plurality of rack-side contacts 50'.

When a rack-side connecting member 93 and a battery-side contact 130 are inserted into a rack-side connector 20, the beam portions 51' are elastically deformed in a cantilever fashion so that the distances between the first contact portions 51d and between the second contact portions 51e are increased, thereby holding the rack-side connecting member 93 between the first contact portions 51d and holding the battery-side contact 130 between the second contact portions 51e.

Next, the structures of a first control portion 33 of a first housing 30 and a second control portion 43 of a second housing 40 in the second embodiment will be described hereinbelow.

In the second embodiment, a portion corresponding to the second portion 43b of the second control portion 43 of the second housing 40 in the first embodiment is not provided.

Figure 30:
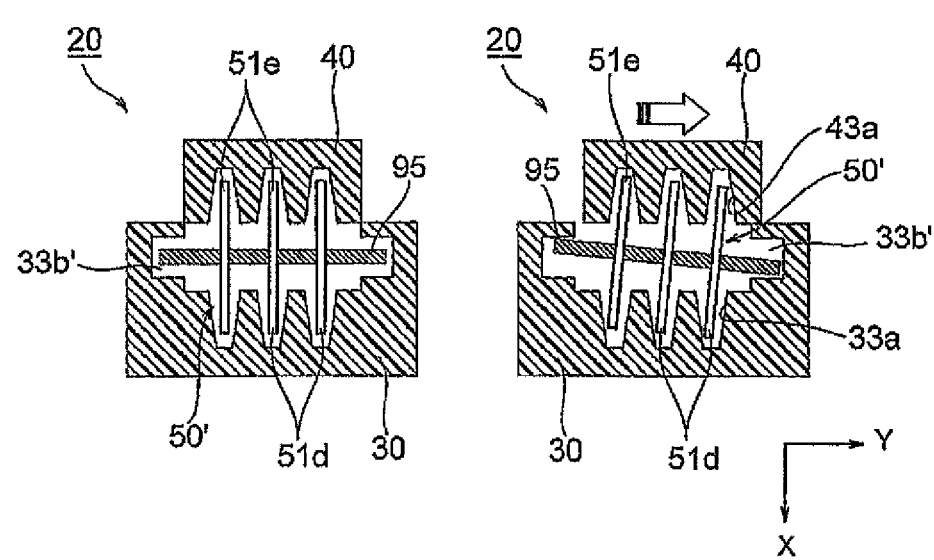
FIG. 30 is an explanatory diagram, as seen from the third direction, schematically showing a state of a first control portion, a second control portion, and the rack-side contacts when a second housing moves relative to a first housing in a rack-side connector in the second embodiment.
Figure 31:
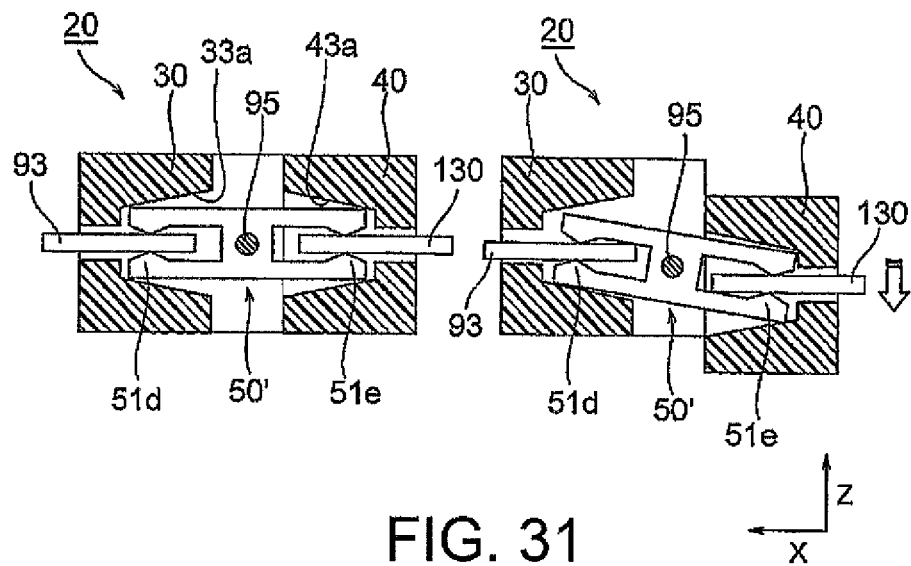
FIG. 31 is an explanatory diagram, as seen from the second direction, schematically showing a state of the first control portion, the second control portion, and the rack-side contact when the second housing moves relative to the first housing in the rack-side connector in the second embodiment.

As shown in FIGS. 29 and 30, the structures and functions of first portions 33a of the first control portion 33 of the first housing 30 and first portions 43a of the second control portion 43 of the second housing 40 in the second embodiment are the same as those in the first embodiment.

On the other hand, the configuration of a second portion 33b' of the first control portion 33 of the first housing 30 in the second embodiment differs from that in the first embodiment. That is, in the second embodiment, the second portion 33b' of the first control portion 33 is configured as recesses formed on both inner walls, in the second direction Y, of a first contact receiving portion 31. As shown in FIG. 30, both ends of the shaft member 95 are disposed in these recesses as the second portion 33b', thereby controlling the position of the rack-side contacts 50' in the first direction X.

In the second embodiment thus obtained, the manufacturing load of the rack-side contact 50' can be reduced compared to the first embodiment in which the rack-side contact 50 comprises the pair of separately formed conductive members 51 and the biasing member 52 and the pair of conductive members 51 and the biasing member 52 should be attached to each other.

Next, a power storage device according to a third embodiment of this invention will be described with reference to FIG. 32.

Herein, in the power storage device according to the third embodiment of this invention, only part of the structures, such as the positional relationship between a first flange portion, a second flange portion, and a rack-side attaching panel and the number of rack-side locking members, differ from those in the first embodiment. Hereinbelow, only the different points between the first embodiment and the third embodiment will be described.

First, the positional relationship between a first flange portion 35 formed in a first housing 30, a second flange portion 45 formed in a second housing 40, and a rack-side attaching panel 80 in the third embodiment will be described hereinbelow.

In the first embodiment described above, in the state where the rack-side connector 20 is attached to the rack-side attaching panel 80, the first housing 30 and the second flange portion 45 are interposed between the flange portions 92b formed in the rack-side attaching members 92 and the rack-side attaching panel 80.

Figure 32:
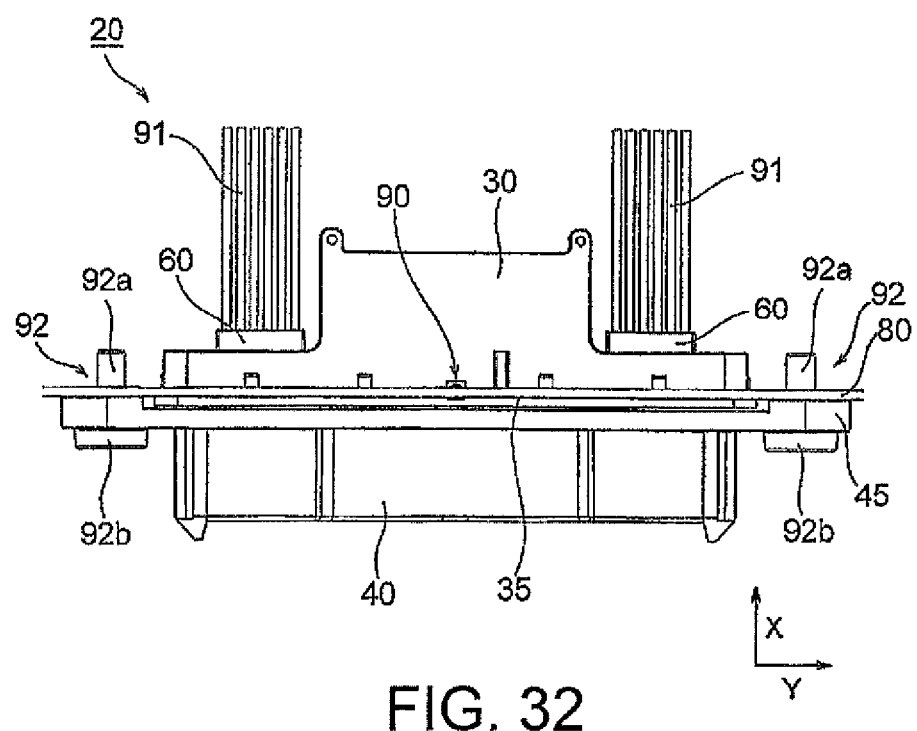
FIG. 32 is an explanatory diagram, as seen from the third direction, showing a power storage device according to a third embodiment of this invention.
Figure 33:
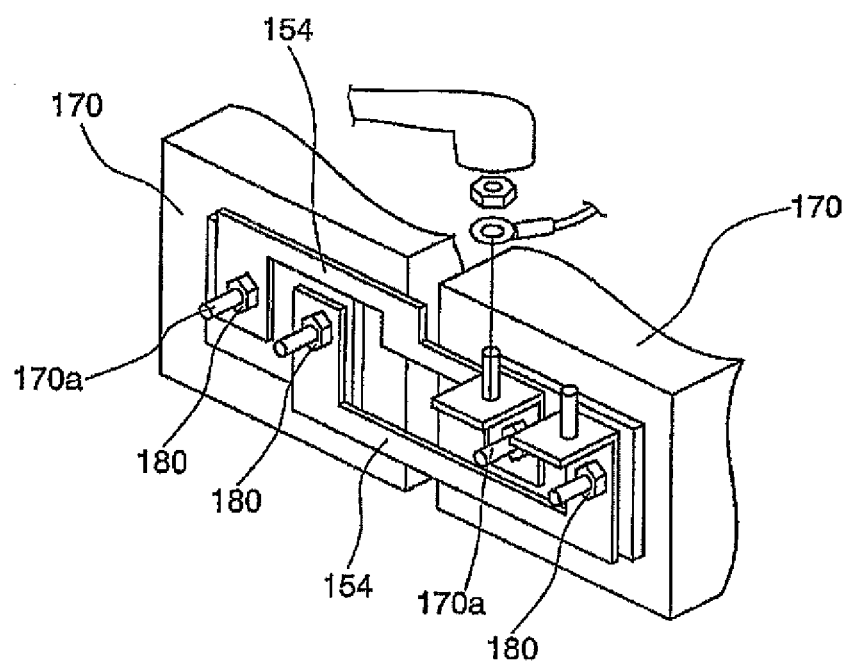
FIG. 33 is an explanatory diagram showing a conventional plug-in connector.

On the other hand, in the third embodiment, as shown in FIG. 32, in the state where a rack-side connector 20 is attached to the rack-side attaching panel 80, only the second flange portion 45 is interposed between flange portions 92b formed in rack-side attaching members 92 and the rack-side attaching panel 80.

In the third embodiment, as shown in FIG. 32, the first flange portion 35 is held between the second housing 40 (particularly the second flange portion 45) and the rack-side attaching panel 80 so that the first housing 30 is fixed to the rack-side attaching panel 80.

Further, the numbers of the rack-side locking members 90 differ from each other in the first embodiment and the third embodiment. That is, three rack-side locking members 90 are used in the first embodiment while one rack-side locking member 90 is used in the third embodiment.

In this embodiment thus obtained, since only the second flange portion 45 is interposed between the flange portions 92b and the rack-side attaching panel 80 in the state where the rack-side connector 20 is attached to the rack-side attaching panel 80, compared to the first embodiment in which the first housing 30 and the second flange portion 45 are interposed between the flange portions 92b and the rack-side attaching panel 80, it is not necessary to consider the tolerance of the thickness of the first flange portion 35 in the first direction X and thus it is possible to reduce backlash between the rack-side attaching panel 80 and the rack-side connector 20.

In the plurality of embodiments described above, the description has been given assuming that a first housing and a second housing of a rack-side connector both have control portions that control the position and posture of a rack-side contact in a rack-side contact receiving portion. However, the control portion may be provided in only one of the housings.

In the plurality of embodiments described above, the description has been given assuming that a first housing of a rack-side connector is fixed to an attaching object (rack-side attaching panel). However, the first housing may be attached to the attaching object (rack-side attaching panel) so as to be movable relative thereto.

In the plurality of embodiments described above, the description has been given assuming that a rack-side contact is entirely received in a rack-side contact receiving portion. However, the rack-side contact may partially protrude to the outside of the rack-side contact receiving portion.

DESCRIPTION OF SYMBOLS 1 power storage device
10 receiving rack
20 rack-side connector (connector)
21 rack-side contact receiving portion (contact receiving portion)
22 rack-side signal connector receiving portion
30 first housing
31 first contact receiving portion
32 first insertion opening
33 first control portion
33a first portion
33b second portion
34 first signal connector receiving portion
35 first flange portion
36 attaching member hole
37 first locking member hole
40 second housing
41 second contact receiving portion
42 second insertion opening
43 second control portion
43a first portion
43b second portion
44 second signal connector receiving portion
45 second flange portion
46 front-side fitting portion
47 rear-side fitting portion
48 attaching member recess
49 second locking member hole
50, 50' rack-side contact (contact)
51 conductive member
51' beam portion
51a base portion
51b attaching portion
51c support portion
51d first contact portion
51e second contact portion
52 biasing member
52' connecting portion
52a' hole
60 rack-side signal connector (signal connector)
61 rack-side signal housing 62 spring portion
70 battery unit receiving portion
80 rack-side attaching panel (attaching object)
81 attaching opening
82 attaching member hole
90 rack-side locking member
91 rack-side signal cable
92 rack-side attaching member
92a shaft portion
92b flange portion
93 rack-side connecting member (connecting member)
93a terminal
93b cable
94 cover
95 shaft member
100 battery unit
110 battery-side connector
120 battery-side housing
125 coating portion
125a slit
130 battery-side contact
131 contact portion
140 battery-side signal connector
160 battery-side connecting member (cable with crimp terminals)
192 battery
193 control circuit
X first direction
Y second direction
Z third direction

The invention claimed is:

1. A power storage device comprising:
a plurality of battery unit receiving portions for receiving battery units;
a plurality of connectors each floatable in a plane intersecting a direction of insertion of the battery unit into the battery unit receiving portion;
an attaching object to which the plurality of connectors are attached; and
a connecting member that connects between the plurality of connectors,
wherein each connector comprises a first housing that is attached to the attaching object, a second housing that is attached to the first housing and forms a contact receiving portion jointly with the first housing, and a contact that is at least partially received in the contact receiving portion,
wherein the second housing is attached to the first housing so as to be movable relative to the first housing in the plane intersecting the direction of insertion of the battery unit,
wherein the contact is received in the contact receiving portion in a state where the contact is not fixed to the first housing or the second housing so as to be movable relative to the first housing and the second housing, and
wherein the first housing comprises a first control portion that controls a position and posture of the contact in the contact receiving portion or the second housing comprises a second control portion that controls a position and posture of the contact in the contact receiving portion.

2. The power storage device according to claim 1, wherein the connecting member is inserted into the connectors from a side opposite to the direction of insertion of the battery unit so as to be connected to the connectors.

3. The power storage device according to claim 2, wherein the contact comprises a first contact portion that is disposed on a first housing side for contact with the connecting member.

4. The power storage device according to claim 2, wherein the contact comprises a second contact portion that is disposed on a second housing side for contact with a battery-side contact of a battery-side connector attached to the battery unit.

5. The power storage device according to claim 1, wherein the contact comprises a first contact portion that is disposed on the first housing side for contact with the connecting member.

6. The power storage device according to claim 5, wherein the contact comprises a second contact portion that is disposed on a second housing side for contact with a battery-side contact of a battery-side connector attached to the battery unit.

7. The power storage device according to claim 5, wherein the first housing comprises a first control portion that controls a position and posture of the contact in the contact receiving portion.

8. The power storage device according to claim 1, wherein the contact comprises a second contact portion that is disposed on the second housing side for contact with a battery-side contact of a battery-side connector attached to the battery unit.

9. The power storage device according to claim 8, wherein the first housing comprises a first control portion that controls a position and posture of the contact in the contact receiving portion.

10. The power storage device according to claim 1, wherein the contact comprises a pair of conductive members facing each other and a biasing member provided between the pair of conductive members and biasing the pair of conductive members toward each other.

11. The power storage device according to claim 1, further comprising a signal connector that is attached to the second housing,
wherein the signal connector moves along with the second housing relative to the first housing when the second housing moves relative to the first housing.

12. The power storage device according to claim 1, further comprising a cover that covers the connecting member in a state where the connecting member is attached to the connectors.

13. The power storage device according to claim 1, further comprising the battery units that are received in the battery unit receiving portions,
wherein each battery unit comprises a battery incorporated in the battery unit and a battery-side connector connected to the battery, and
wherein the battery-side connector is connected to the connector when the battery unit is received in the battery unit receiving portion.

14. The power storage device according to claim 13, wherein the battery-side connector comprises a pair of battery-side contacts one of which is connected to a positive electrode of the battery and the other of which is connected to a negative electrode of the battery.

15. The power storage device according to claim 13,
wherein the battery-side connector comprises a battery-side housing,
wherein the power storage device further comprises a battery-side signal connector attached to the battery-side housing, and wherein the battery-side signal connector is connected to a control circuit of the battery.

16. The power storage device according to claim 15, wherein the battery-side signal connector is connected to a signal connector attached to the connector when the battery unit is received in the battery unit receiving portion.

17. The power storage device according to claim 1, wherein the first housing comprises a first control portion that controls a position and posture of the contact in the contact receiving portion, and
wherein the second housing comprises a second control portion that controls a position and posture of the contact in the contact receiving portion.

18. A power storage device comprising:
a plurality of battery unit receiving portions for receiving battery units;
a plurality of connectors each floatable in a plane intersecting a direction of insertion of the battery unit into the battery unit receiving portion;
an attaching object to which the plurality of connectors are attached; and
a connecting member that connects between the plurality of connectors
wherein each connector comprises a first housing that is attached to the attaching object, a second housing that is attached to the first housing and forms a contact receiving portion jointly with the first housing, and a contact that is at least partially received in the contact receiving portion,
wherein the second housing is attached to the first housing so as to be movable relative to the first housing in the plane intersecting the direction of insertion of the battery unit,
wherein the contact is received in the contact receiving portion in a state where the contact is not fixed to the first housing or the second housing so as to be movable relative to the first housing and the second housing, and
wherein the contact comprises a pair of conductive members facing each other and a biasing member provided between the pair of conductive members and biasing the pair of conductive members toward each other.

19. The power storage device according to claim 18, wherein the connecting member is inserted into the connectors from a side opposite to the direction of insertion of the battery unit so as to be connected to the connectors.

20. The power storage device according to claim 19, wherein the contact comprises a first contact portion that is disposed on a first housing side for contact with the connecting member.

21. The power storage device according to claim 19, wherein the contact comprises a second contact portion that is disposed on a second housing side for contact with a battery-side contact of a battery-side connector attached to the battery unit.

22. The power storage device according to claim 18, wherein the contact comprises a first contact portion that is disposed on the first housing side for contact with the connecting member.

23. The power storage device according to claim 22, wherein the contact comprises a second contact portion that is disposed on a second housing side for contact with a battery-side contact of a battery-side connector attached to the battery unit.

24. The power storage device according to claim 22, wherein the first housing comprises a first control portion that controls a position and posture of the contact in the contact receiving portion.

25. The power storage device according to claim 18, wherein the contact comprises a second contact portion that is disposed on the second housing side for contact with a battery-side contact of a battery-side connector attached to the battery unit.

26. The power storage device according to claim 25, wherein the first housing comprises a first control portion that controls a position and posture of the contact in the contact receiving portion.

27. The power storage device according to claim 18, further comprising a signal connector that is attached to the second housing,
wherein the signal connector moves along with the second housing relative to the first housing when the second housing moves relative to the first housing.

28. The power storage device according to claim 18, further comprising a cover that covers the connecting member in a state where the connecting member is attached to the connectors.

29. The power storage device according to claim 18, further comprising the battery units that are received in the battery unit receiving portions,
wherein each battery unit comprises a battery incorporated in the battery unit and a battery-side connector connected to the battery, and
wherein the battery-side connector is connected to the connector when the battery unit is received in the battery unit receiving portion.

30. The power storage device according to claim 29, wherein the battery-side connector comprises a pair of battery-side contacts one of which is connected to a positive electrode of the battery and the other of which is connected to a negative electrode of the battery.

31. The power storage device according to claim 29, wherein the battery-side connector comprises a battery-side housing,
wherein the power storage device further comprises a battery-side signal connector attached to the battery-side housing, and
wherein the battery-side signal connector is connected to a control circuit of the battery.

32. The power storage device according to claim 31, wherein the battery-side signal connector is connected to a signal connector attached to the connector when the battery unit is received in the battery unit receiving portion.

33. A power storage device comprising:
a plurality of battery unit receiving portions for receiving battery units;
a plurality of connectors each floatable in a plane intersecting a direction of insertion of the battery unit into the battery unit receiving portion;
an attaching object to which the plurality of connectors are attached; and
a connecting member that connects between the plurality of connectors
wherein each connector comprises a first housing that is attached to the attaching object, a second housing that is attached to the first housing and forms a contact receiving portion jointly with the first housing, and a contact that is at least partially received in the contact receiving portion,
wherein the second housing is attached to the first housing so as to be movable relative to the first housing in the plane intersecting the direction of insertion of the battery unit,
wherein the contact is received in the contact receiving portion in a state where the contact is not fixed to the first housing or the second housing so as to be movable relative to the first housing and the second housing, wherein the contact comprises a first contact portion that is disposed on the first housing side for contact with the connecting member or the contact comprises a second contact portion that is disposed on the second housing side for contact with a battery-side contact of a battery-side connector attached to the battery unit, and wherein the first housing comprises a first control portion that controls a position and posture of the contact in the contact receiving portion.

34. The power storage device according to claim 33, wherein the connecting member is inserted into the connectors from a side opposite to the direction of insertion of the battery unit so as to be connected to the connectors.

35. The power storage device according to claim 33, wherein the contact comprises a second contact portion that is disposed on the second housing side for contact with the battery-side contact of the battery-side connector attached to the battery unit.

36. The power storage device according to claim 33, further comprising a signal connector that is attached to the second housing, wherein the signal connector moves along with the second housing relative to the first housing when the second housing moves relative to the first housing.

37. The power storage device according to claim 33, further comprising a cover that covers the connecting member in a state where the connecting member is attached to the connectors.

38. The power storage device according to claim 33, further comprising the battery units that are received in the battery unit receiving portions, wherein each battery unit comprises a battery incorporated in the battery unit and a battery-side connector connected to the battery, and wherein the battery-side connector is connected to the connector when the battery unit is received in the battery unit receiving portion.

* * * * *